(12) United States Patent
Channaiah et al.

(10) Patent No.: US 11,573,611 B2
(45) Date of Patent: Feb. 7, 2023

(54) INFINITE HOLDING PIVOT MECHANISMS FOR DUAL SCREEN SYSTEMS

(71) Applicant: Intel Corporation, Santa Clara, CA (US)

(72) Inventors: Yogesh Channaiah, Karnataka (IN); Samarth Alva, Bangalore (IN); Krishnakumar Varadarajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/365,122

(22) Filed: Jul. 1, 2021

(65) Prior Publication Data

US 2021/0333840 A1    Oct. 28, 2021

Related U.S. Application Data

(63) Continuation of application No. 16/553,311, filed on Aug. 28, 2019, now abandoned.

(51) Int. Cl.
 *G06F 1/16* (2006.01)
 *E05D 11/10* (2006.01)

(52) U.S. Cl.
 CPC .......... *G06F 1/1681* (2013.01); *E05D 11/105* (2013.01); *E05D 11/1078* (2013.01); *G06F 1/1616* (2013.01); *G06F 1/1647* (2013.01); *E05Y 2201/218* (2013.01); *E05Y 2201/418* (2013.01); *E05Y 2201/48* (2013.01); *E05Y 2900/606* (2013.01)

(58) Field of Classification Search
 None
 See application file for complete search history.

(56) References Cited

U.S. PATENT DOCUMENTS

| 5,383,340 | A |   | 1/1995 | Larson et al. |
| 5,774,333 | A | * | 6/1998 | Janik ................. G06F 1/1632 361/679.48 |
| 5,880,929 | A |   | 3/1999 | Bhatia |
| 5,946,187 | A |   | 8/1999 | Cipolla |

(Continued)

OTHER PUBLICATIONS

Final Office Action in U.S. Appl. No. 16/553,311 dated Jan. 6, 2021, 18 pages.

(Continued)

*Primary Examiner* — Anthony Q Edwards
*Assistant Examiner* — Rashen E Morrison
(74) *Attorney, Agent, or Firm* — Patent Capital Group

(57) ABSTRACT

There is disclosed in one example, an encasement for a mobile computer, including: an external casing in a clamshell form factor, the external casing including a base, a secondary display chassis hingedly connected to the base at a secondary hinge, and a primary display chassis hingedly connected to the secondary display chassis at a primary hinge disposed at a removed edge of the secondary display chassis from the secondary hinge, the primary display chassis to substantially overlay the secondary display chassis and the base when the primary hinge is in a closed position; and pivot means disposed to substantially bias the secondary hinge against movement from a selected position in at least one direction in the absence of an electrical input.

19 Claims, 17 Drawing Sheets

(56) References Cited

U.S. PATENT DOCUMENTS

| | | | |
|---|---|---|---|
| 5,982,617 A * | 11/1999 | Haley | G06F 1/203 |
| | | | 361/679.46 |
| 6,212,069 B1 * | 4/2001 | Janik | G06F 1/1637 |
| | | | 361/679.55 |
| 6,392,871 B1 | 5/2002 | Yanase | |
| 6,714,403 B2 | 3/2004 | Furuki et al. | |
| 7,447,003 B2 | 11/2008 | Yang | |
| 7,808,776 B2 * | 10/2010 | Bauer, Jr. | G06F 1/1616 |
| | | | 361/679.26 |
| 9,104,382 B2 * | 8/2015 | Chen | G06F 1/1681 |
| 9,122,454 B2 | 9/2015 | Chen et al. | |
| 9,137,913 B2 | 9/2015 | Hsu et al. | |
| 9,152,190 B2 * | 10/2015 | Heymann | G06F 1/203 |
| D752,575 S | 3/2016 | Riddiford et al. | |
| 9,354,667 B2 * | 5/2016 | Yang | G06F 1/1679 |
| 9,740,253 B2 | 8/2017 | Cheng et al. | |
| 10,289,176 B1 | 5/2019 | Chen et al. | |
| 10,466,750 B2 | 11/2019 | Lee et al. | |
| 10,592,051 B1 | 3/2020 | Yildiz et al. | |
| 2002/0069753 A1 | 6/2002 | Lauderbach et al. | |
| 2006/0026764 A1 | 2/2006 | Mossbeck | |
| 2006/0139862 A1 * | 6/2006 | Wang | G06F 1/1641 |
| | | | 361/679.3 |
| 2011/0023272 A1 * | 2/2011 | Huang | E05D 11/087 |
| | | | 16/362 |
| 2011/0147546 A1 | 6/2011 | Monsalve et al. | |
| 2011/0177850 A1 * | 7/2011 | Griffin | H04M 1/0216 |
| | | | 455/575.3 |
| 2013/0009034 A1 | 1/2013 | Fallows | |
| 2013/0174401 A1 | 7/2013 | Brogan et al. | |
| 2013/0187024 A1 | 7/2013 | Obujen et al. | |
| 2013/0301201 A1 | 11/2013 | Hsu et al. | |
| 2015/0092329 A1 * | 4/2015 | Balasundaram | G06F 1/1616 |
| | | | 361/679.09 |
| 2015/0212545 A1 | 7/2015 | Ding | |
| 2018/0210504 A1 | 7/2018 | Moser | |
| 2018/0329464 A1 * | 11/2018 | Lin | G06F 1/1681 |
| 2019/0064886 A1 | 2/2019 | Wendt | |
| 2019/0129476 A1 * | 5/2019 | Alva | F03G 7/06 |
| 2019/0178440 A1 | 6/2019 | Chang | |
| 2019/0220066 A1 | 7/2019 | Sundaram et al. | |
| 2020/0341515 A1 | 10/2020 | Moser et al. | |

OTHER PUBLICATIONS

Non Final Office Action in U.S. Appl. No. 16/553,311 dated Jun. 15, 2020, 19 pages.

Notice of Allowance in U.S. Appl. No. 16/553,311 dated Apr. 1, 2021, 9 pages.

* cited by examiner

INFINITE HOLDING PIVOT MECHANISMS FOR DUAL SCREEN SYSTEMS

CROSS REFERENCE TO RELATED APPLICATIONS

This Application is a continuation (and claims the benefit of priority under 35 U.S.C. § 120) of U.S. application Ser. No. 16/553,311, filed Aug. 28, 2019 and entitled Infinite Holding Pivot Mechanisms for Dual Screen Systems. The disclosure of the prior Application is considered part of and is incorporated by reference in the disclosure of this Application.

FIELD OF THE SPECIFICATION

This disclosure relates in general to the field of mobile computing, and more particularly, though not exclusively, to a system and method for providing infinite holding pivot mechanisms for dual screen systems.

BACKGROUND

Gaming laptops are a major driver of innovation in the personal computing industry. Gamers often require or desire cutting-edge features for their computing experience.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
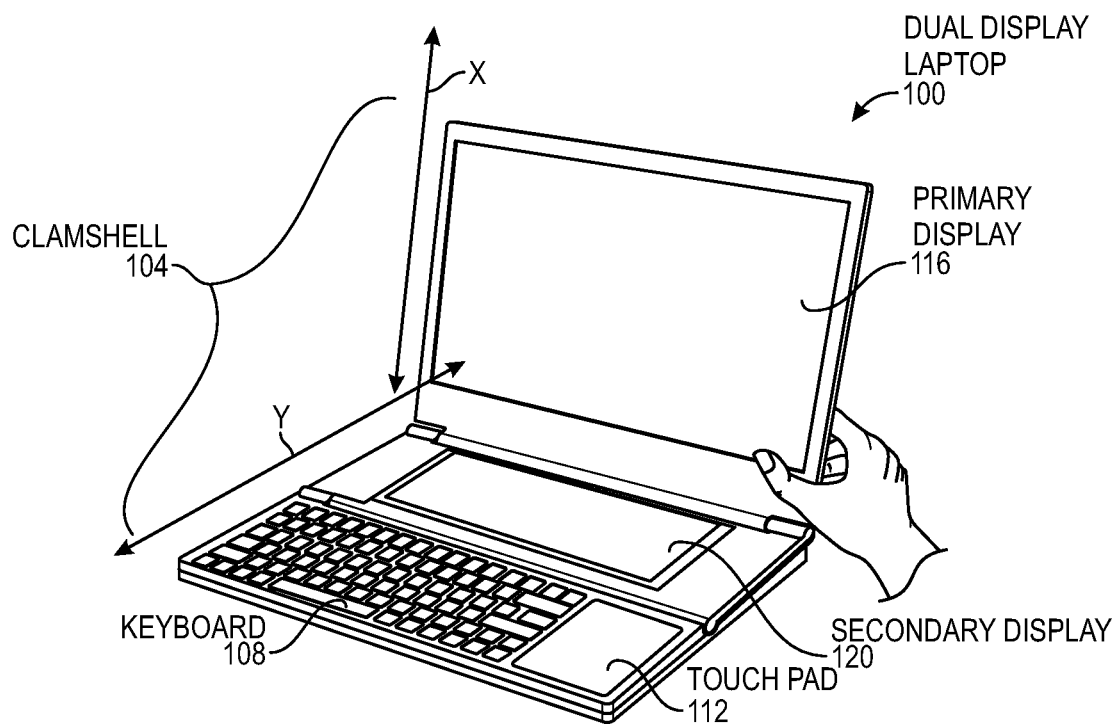
FIG. 1 is a perspective view of a dual screen laptop computer.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

A contemporary computing platform may include a complex and multi-faceted hardware platform provided by Intel®, another vendor, or combinations of different hardware from different vendors. For example, a large data center such as may be provided by a cloud service provider (CSP), a high-performance computing (HPC) cluster, or a hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by flexibility to dynamically assign resources according to current workloads and needs. This can be accomplished, for example, by assigning a compute workload to a guest device, wherein resources such as hardware, storage, and networks are provided to a virtual machine, container, or disaggregated node by way of nonlimiting example.

In embodiments of the present disclosure, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

A relatively recent innovation in laptop computing is the dual screen gaming laptop. A dual screen gaming laptop may have a traditional laptop screen, such as a 15-inch full high-definition multimedia interface (HDMI) widescreen display. The dual screen gaming laptop also features a secondary screen, usually smaller, located on the base of the device just above the keyboard, as illustrated in FIG. 1.

Dual screen gaming devices are expected to be an important segment in the laptop market. The form factor includes a dual screen integrated into a powerful gaming clamshell. This design provides gamers and users with dual screens for various usage scenarios. For example, a user playing a first-person shooter may have the primary gaming display on the primary display of the laptop. The user may also display a chat window or other real-time feed on the secondary display. This permits the user to employ the full primary display for full-screen gaming, without losing secondary information such as a chat window, streaming information, an inventory display, map, or other secondary information.

One drawback of some existing dual display gaming laptops is simply that the secondary display is on a completely different axis from the primary display. This makes it difficult to operate the two displays in a comfortable and ergonomic manner.

The secondary display can be hinged so that it can be moved up to a better axis. However, in one illustrative example, the torque for holding the secondary screen is around 30 kilograms per centimeter (kg-cm). This is more than twice the torque of the primary hinge for the laptop, which is around 12 kg-cm. Furthermore, the torque is acting on a shorter lever arm. Thus, in order to achieve different elevation modes, a large amount of force may be required to be applied on parts that may end up deforming or breaking as the screen is used.

Embodiments of the present specification employ a mechanism that allows for engagement and disengagement of torque as required for easy rotation of a dual display screen. In an embodiment, a compact mechanism is provided to integrate all of the mechanical elements into an existing hinge package through a one-way needle bearing and a set of Hirth rings, which allows the user to disengage the torque and freely rotate the parts or link when input is given by the user. This provides for infinite adjustment on the angle not limited to a few degrees.

Some embodiments require a trigger to move the screen as desired by the user. This requires the user to lift the display to relieve the moment acting on the Hirth rings due to the weight of the parts, and then press a button. Some users have found this to be counterintuitive enough to move the display in the reverse direction. Furthermore, while lowering the display, the display may be positioned at a predefined finite position, depending on the number of teeth on the Hirth rings. Thus, the user may require additional action to get the display to a desired angle. Furthermore, it is desirable to provide instant disengagement as soon as the user intent is captured.

Additional embodiments of the present specification provide an automated solution that can be scaled for mass production. This provides improvements over systems that require a trigger. The present specification illustrates a number of different mechanical mechanisms that may act as means for providing an infinite pivot holding point.

It should be noted that a standard hinge design on a dual display notebook would increase the torque of the second hinge to very high levels. This may prevent a user from being able to move the screen up and down without significant effort. However, embodiments of the present specification provide at least five different mechanical mechanisms for achieving an infinite holding pivot point of a secondary display. Some of the parts illustrated herein are products that do not presently exist in the market, but that provide the desired result.

Some of the mechanism designs have been miniaturized to fit into the clamshell form factor and to ease manufacturability and assembly.

Embodiments of the present specification also provide accidental trigger prevention (ATP) to ensure that there is no false activation of the trigger. This helps to improve the safety of the design.

These designs provide advantages, as dual screens and gaming notebooks are a present growth area. The specific requirements of dual screens, especially related to gaming, present challenges related to the position and size of the secondary screen. It is beneficial to place the secondary screen in a position in line with the primary screen (e.g., collinearly, or to the side). The present specification helps to address the engineering problems of designing a hinge for the secondary screen to achieve the desirable user experience for dual screen gaming notebooks.

A system and method for providing infinite holding pivot mechanisms for dual screen systems will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a perspective view of a dual screen laptop computer 100. Dual screen laptop computer 100 may be used, for example, for gaming or for some other purpose where a dual screen is advantageous.

In this example, dual screen laptop 100 includes a clamshell form factor 104. Within clamshell 104 is a keyboard 108, a touchpad 112, a primary display 116, and a secondary display 120. In this configuration, primary display 116 lies on a planar axis Z, while secondary display 120 lies on a planar axis Y. The orientation of primary display 116 and secondary display 120 on two different axes can affect user comfort, as it is difficult for the user to view and consume at one time all the information on both screens.

Figure 2:
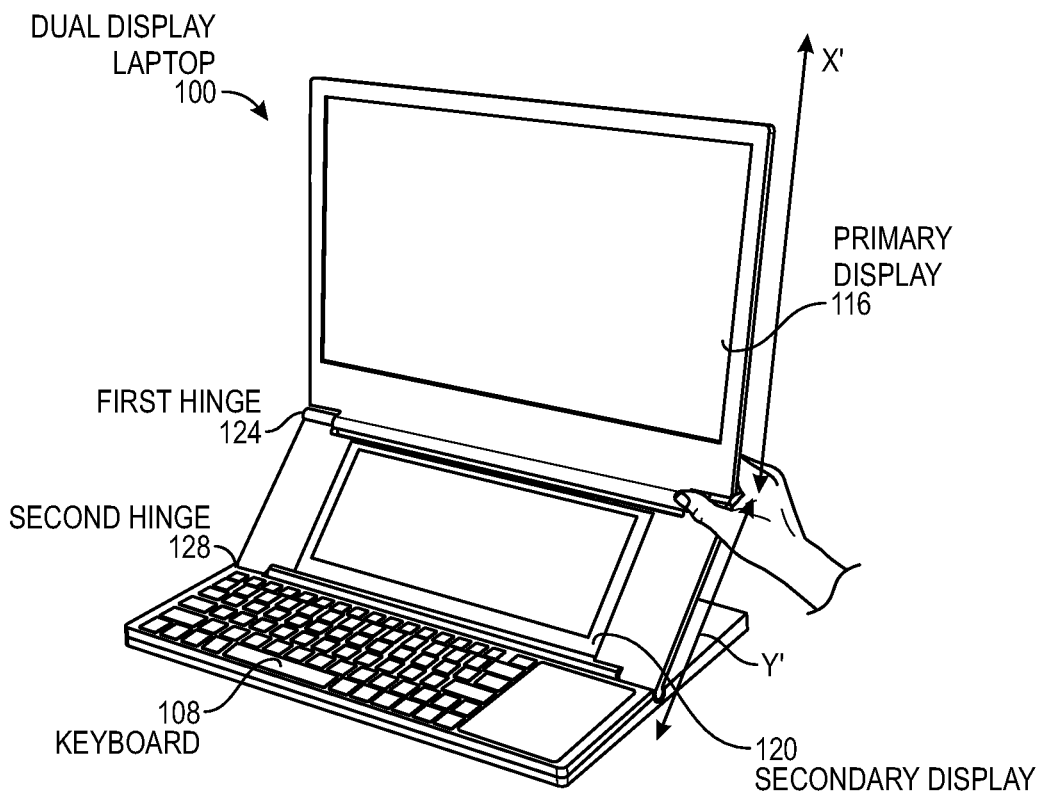
FIG. 2 is a further perspective view of dual display laptop.

FIG. 2 is a further perspective view of dual display laptop 100, illustrating that primary display 116 and secondary display 120 may be hinged on a first hinge 124 and a second hinge 128. In this case, second hinge 128 is positioned proximate to keyboard 108, while first hinge 124 is placed on a removed end of secondary display 120 from second hinge 128. First hinge 124 provides a hinge between primary display 116 and secondary display 120, while second hinge 128 provides a hinge between secondary display 120 and keyboard 108. In this orientation, primary display 116 is on an axis Z prime (Z'), while secondary display 120 is on an axis Y prime (Y'). Because axes Z' and Y' are not orthogonal or nearly orthogonal to each other as in the illustration of FIG. 1, the user may be able to view secondary display 120 much more comfortably in the configuration of FIG. 2 than in the configuration of FIG. 1.

However, this configuration creates stresses on second hinge 128 that are much greater than the stresses on first hinge 124. In one illustrative example, the torque of first hinge 124 as a primary hinge is approximately 12 kg-cm, while the torque on second hinge 128, acting as a secondary hinge, is more than double at approximately 30 kg-cm. For second hinge 128 to be able to hold up secondary display 120 and primary display 116, it may need to be so stiff that it requires excessive force from a user to move second hinge 128.

Thus, a traditional hinging mechanism may not be suitable for some embodiments of the present specification, because of the excessive force on second hinge 128. FIGS. 3-22 below illustrate various embodiments of hinging mechanisms or hinging means that may provide an infinitely adjustable hinge without requiring excessive force or the use of a trigger button.

Figure 7:
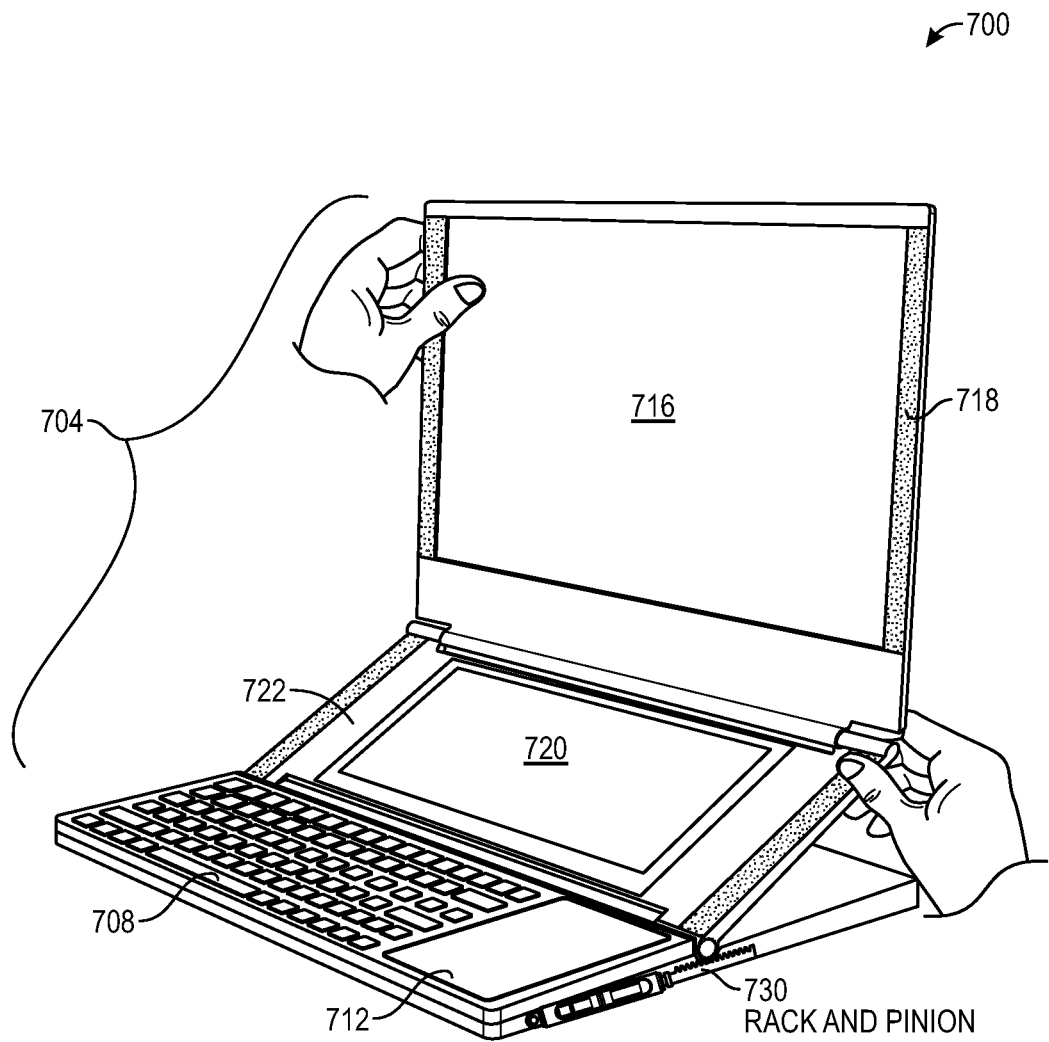
FIGS. 7-9 disclose an embodiment including an LGS in attachment to a rack and pinion mechanism.
Figure 8:
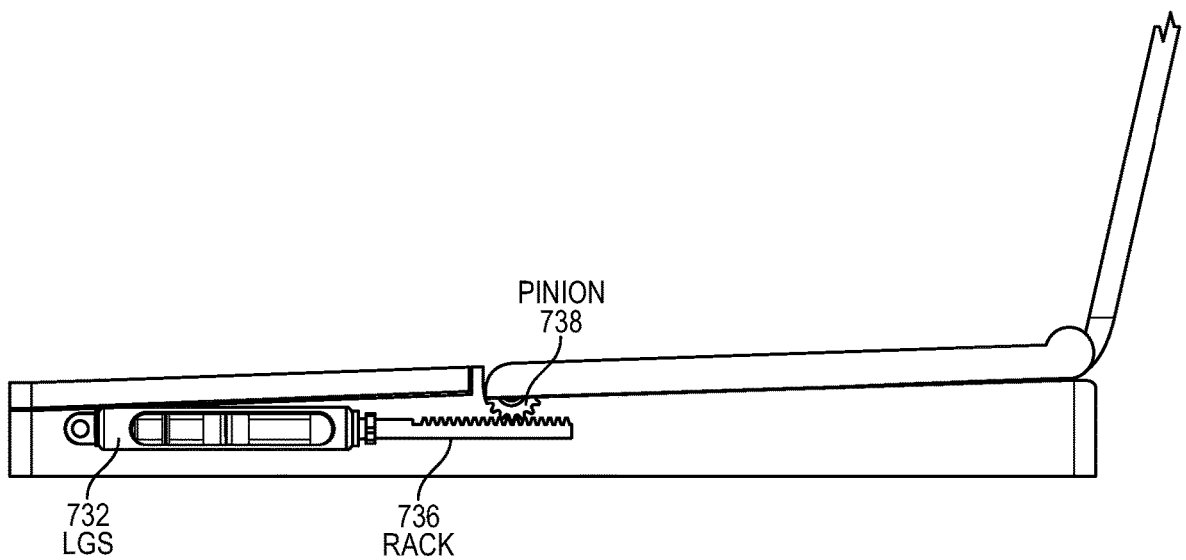
Figure 9:
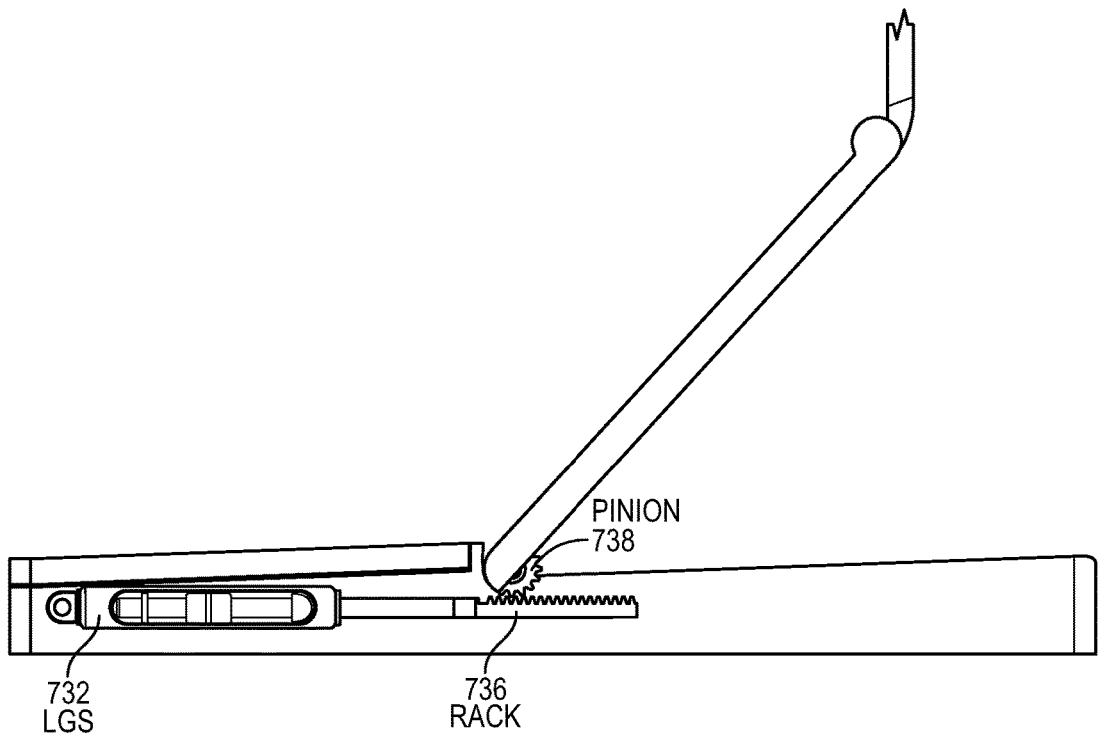
Figure 18:
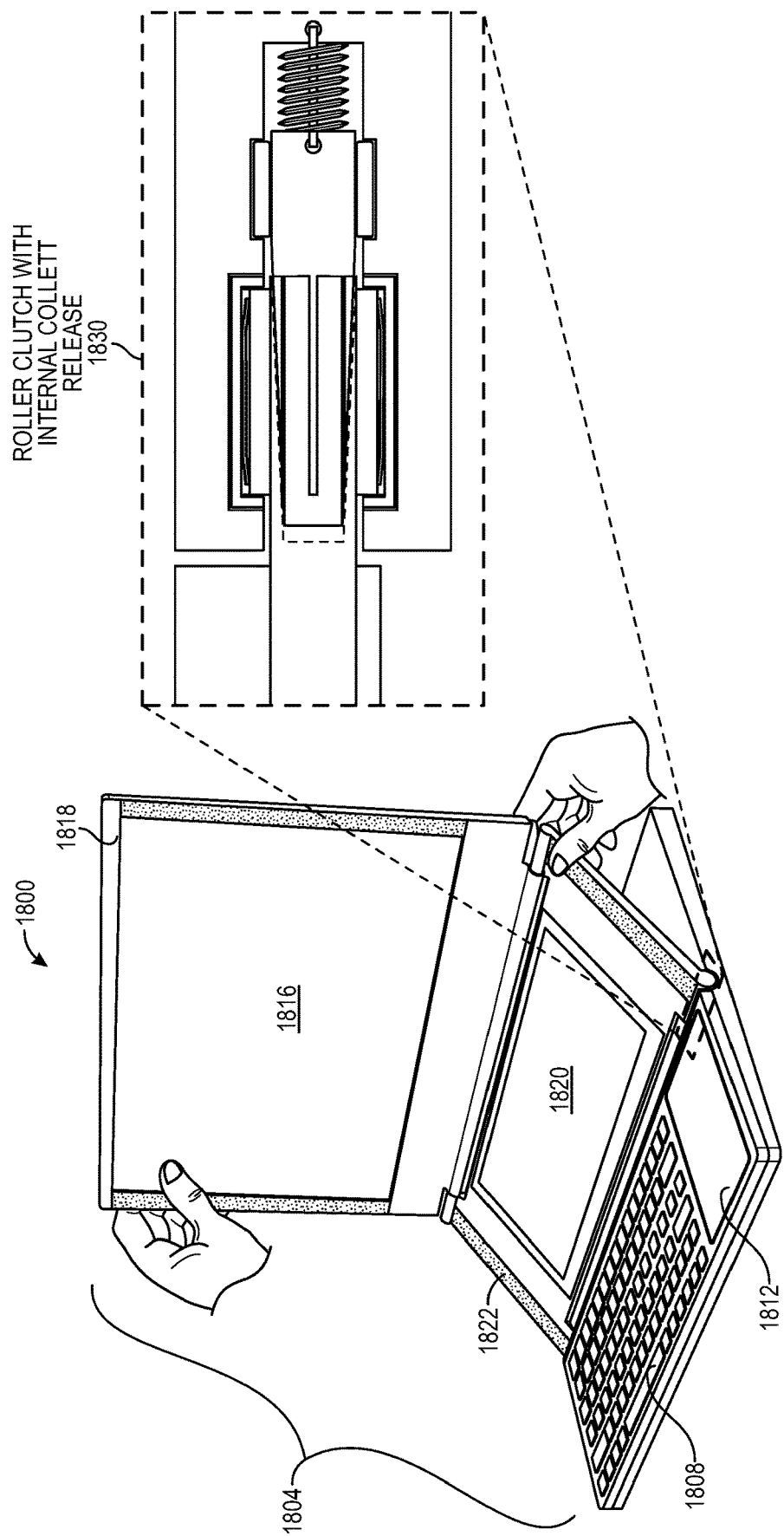
FIG. 18 illustrates the use of a roller clutch with an internal collet release.
Figure 19:
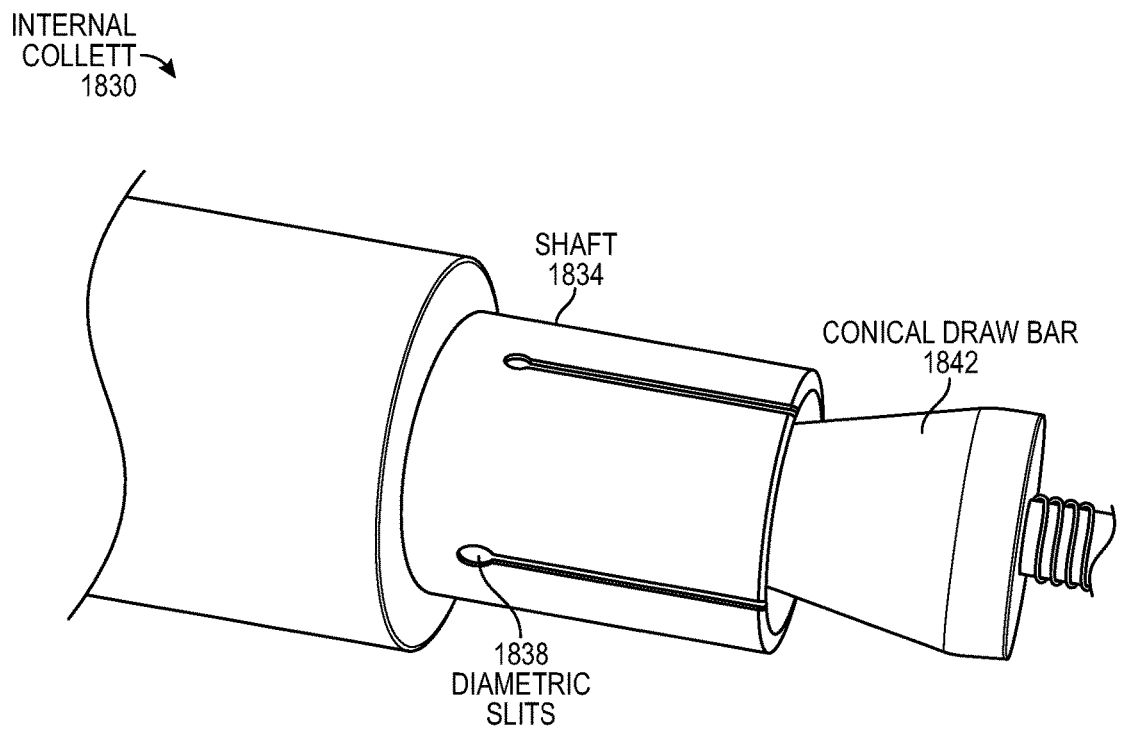
FIG. 19 illustrates an internal collet and drawbar.
Figure 20:
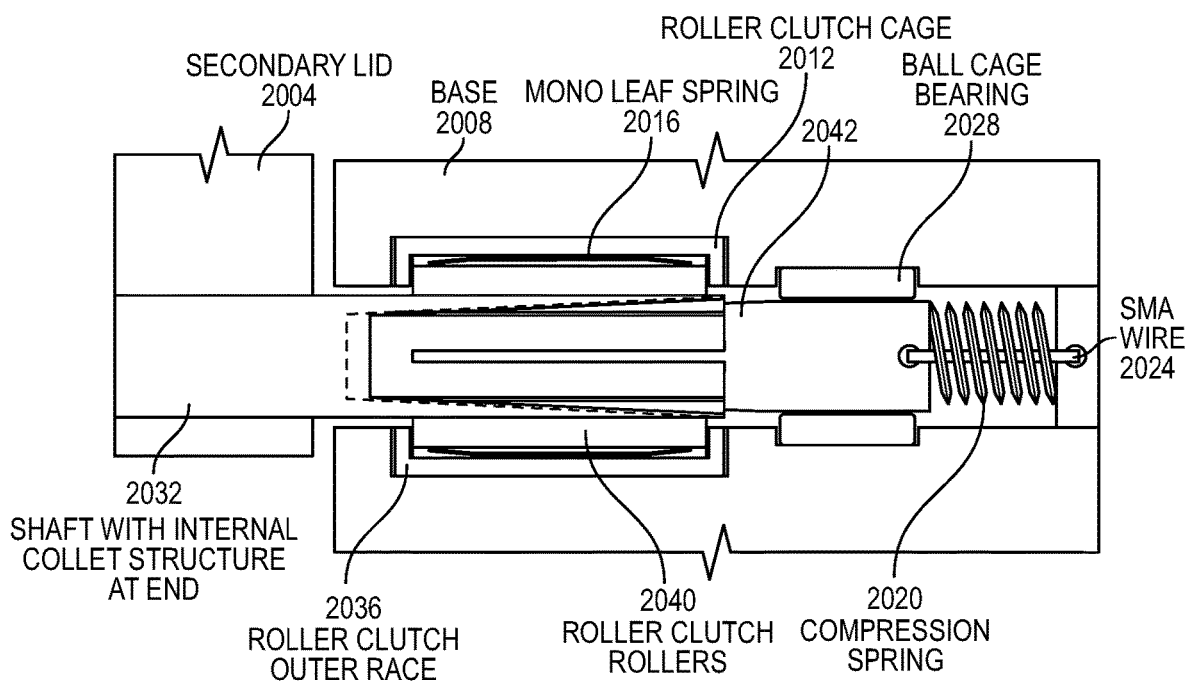
FIG. 20 illustrates additional details of operation of the internal collet.
Figure 21:
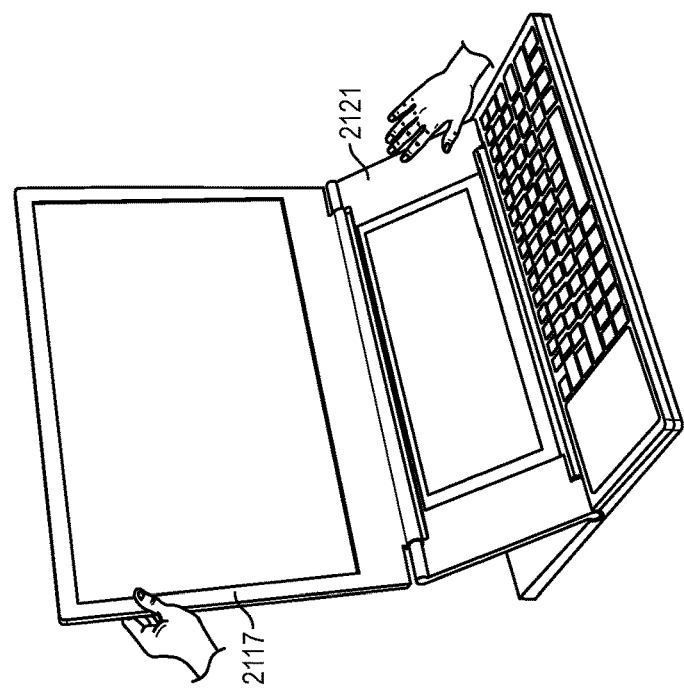
FIGS. 21-22 illustrate an accidental trigger prevention (ATP) mechanism that may be used with any of the embodiments disclosed herein.
Figure 21:
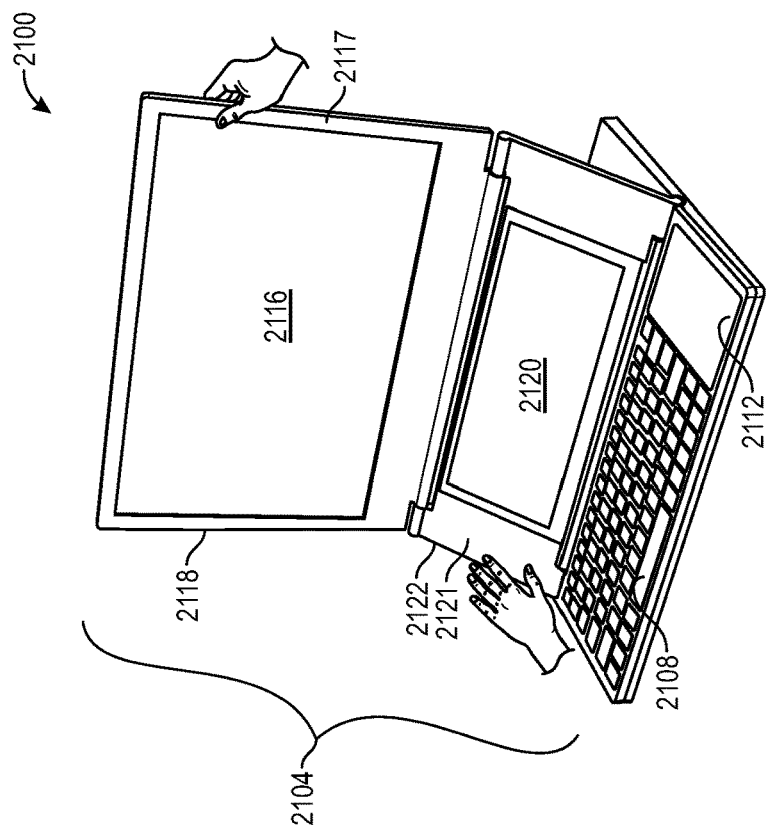
Figure 22:
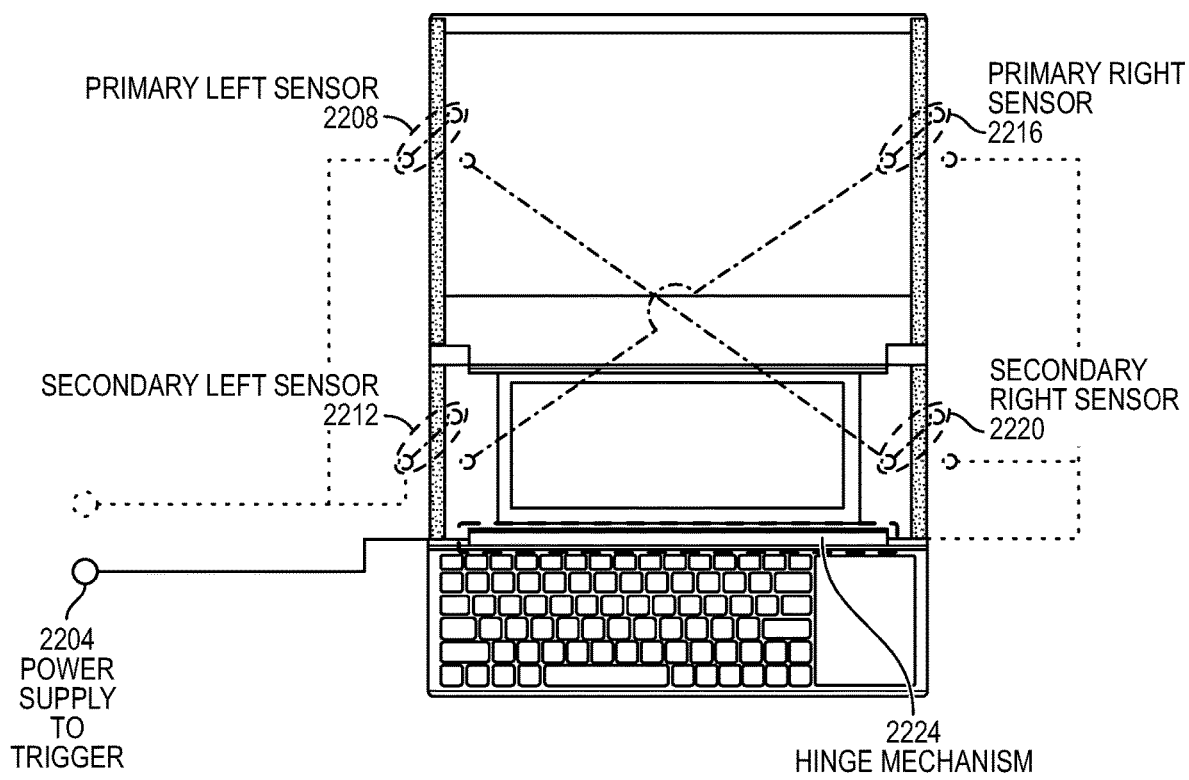

By way of nonlimiting and illustrative example, the following embodiments are disclosed in the present specification: FIGS. 3-6 illustrate the use of a lockable gas spring as a telescopic stand for position control; FIGS. 7-9 illustrate the use of a lockable gas spring in attachment to a rack and pinion mechanism; FIGS. 10-13 illustrate the use of a tapered one-way roller clutch; FIGS. 14-17 illustrate the use of a shape memory alloy (SMA)-based mono leaf spring within a one-way roller clutch; FIGS. 18-20 illustrate the use of an internal collet release with a one-way roller clutch; FIGS. 21-22 illustrate an accidental trigger prevention (ATP) mechanism that may be used with any triggered mechanical configuration, including those illustrated in this specification.

Figure 3:
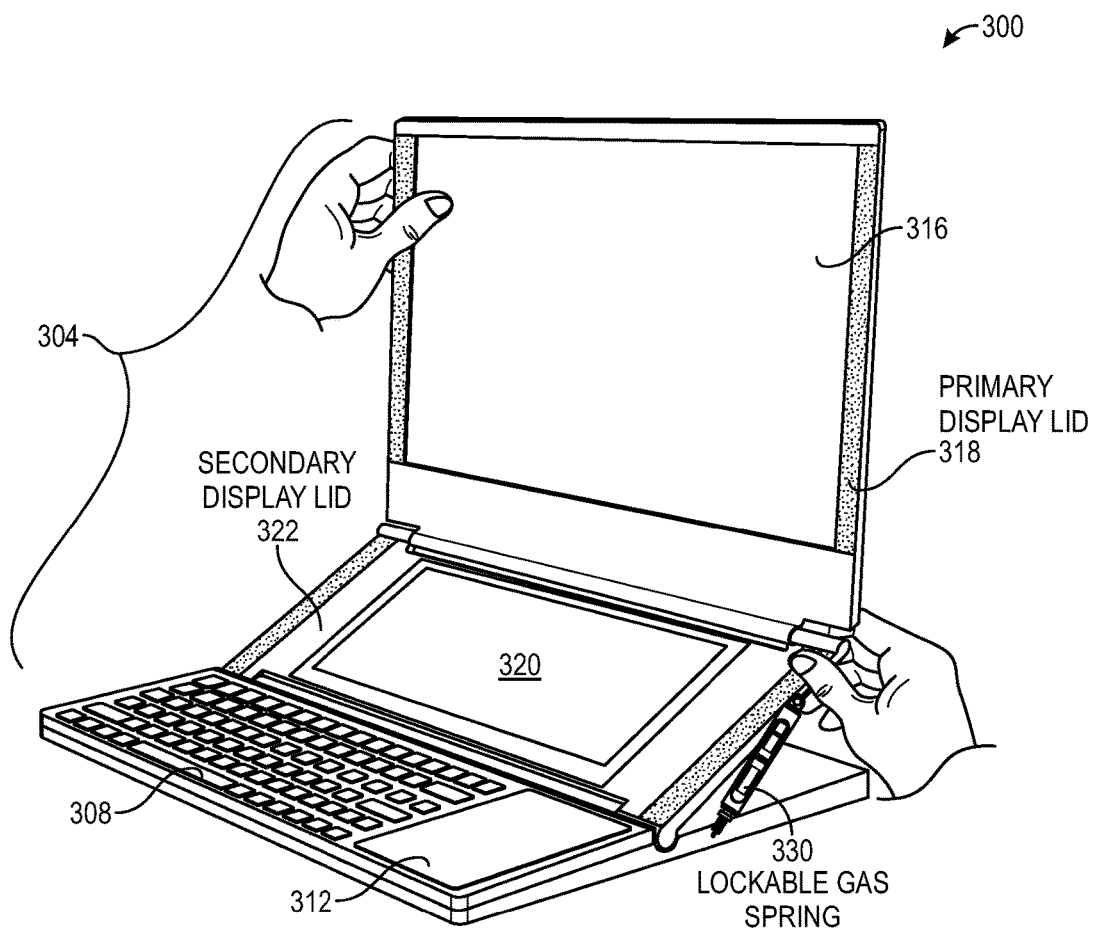
FIGS. 3-6 illustrate the use of a lockable gas spring (LGS) as a telescopic stand for position control in conjunction with a dual screen laptop.

FIGS. 3-6 illustrate the use of a lockable gas spring (LGS) as a telescopic stand for position control in conjunction with a dual screen laptop 300. In FIG. 3, dual screen laptop 300 includes a primary display 316, a secondary display 320, a keyboard 308, and a touchpad 312, all encased within a clamshell 304. Dual screen laptop 300 also includes an LGS 330. LGS 330 is illustrated in more detail in FIG. 4.

Figure 4:
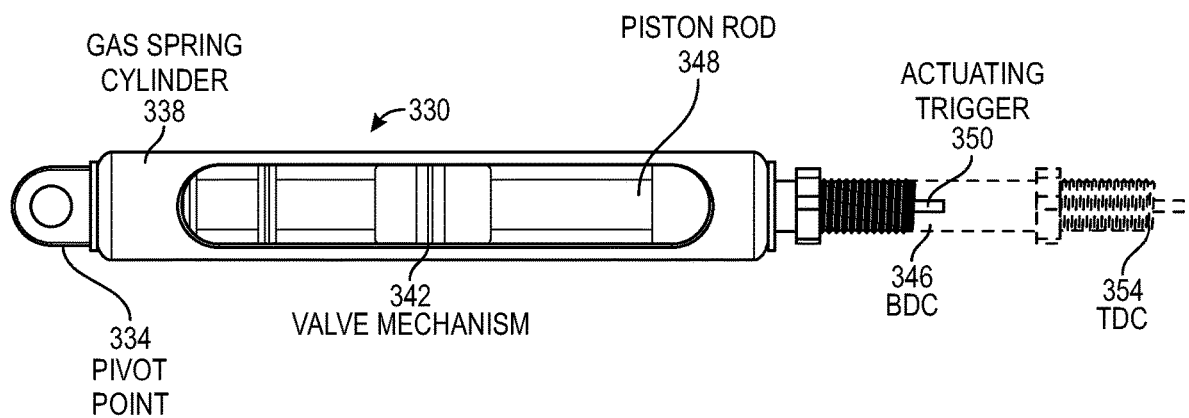

Turning to FIG. 4, LGS 330 includes a pivot point 334, a gas spring cylinder 338, a valve mechanism 342, a bottom dead center (BDC) 346, an actuating trigger 350, and a top dead center (TDC) 354.

Lockable gas springs such as LGS 330 are special-purpose gas springs used to move and hold the position of a lid only when desired. By using a lockable gas spring, a user can position the secondary screen 320 at any desired angle and lock its position. Lockable gas springs act as a rigid support or kickstand when they are locked.

LGS 330 contains an actuating trigger 350 at the end of piston rod 348. Actuating trigger 350, when operated, opens and/or closes valve 342 located on piston rod 348. When actuating trigger to 350 is relieved, valve 342 closes, and the movement of gas or oil is stopped. Piston rod 348 can therefore be controlled throughout the stroke of gas spring cylinder 338.

LGS 330 can be used in a dual screen notebook as a telescopic support stand for secondary lid 322.

Figure 5:
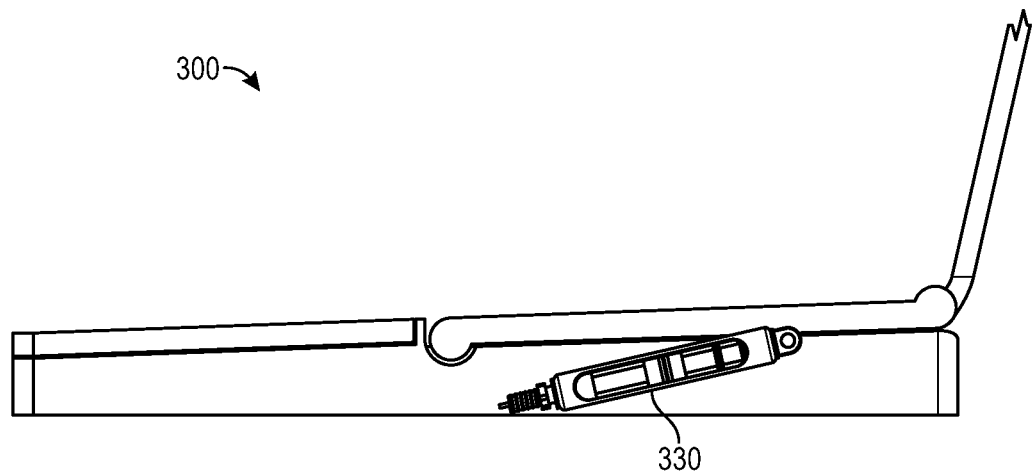
Figure 6:
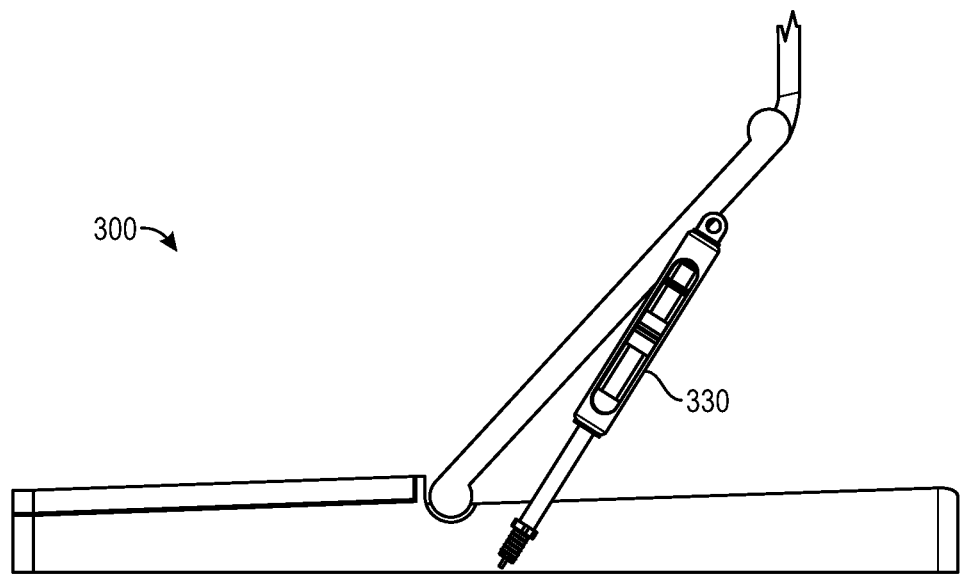

FIGS. 5-6 are side views of dual display laptop 300, illustrating the operation of LGS 330. In the side views of FIGS. 5 and 6, only one LGS 330 is visible. However, in some embodiments, a pair of lockable gas springs may be used, with one LGS disposed on either side of secondary display lid 322. As illustrated in FIG. 5, when LGS 330 is fully compressed, secondary display lid 322 is held in a horizontal or near-horizontal position, and is orthogonal or nearly orthogonal to primary display 316. In contrast, as illustrated in FIG. 6, when LGS 330 is fully extended secondary display lid 322 is in its upright or nearest to upright position. In this orientation, secondary display lid 322 is orthogonal or nearly orthogonal to the base, which contains keyboard 308 and trackpad 312. Furthermore, primary display lid 318 is coplanar or nearly coplanar with secondary display lid 322. This can result in an enhanced viewing experience for the end user.

LGS 330 may be used in conjunction with the ATP mechanism of FIGS. 21 and 22. For example, left and right primary sensors and left and right secondary sensors may be placed on the left and right sides of primary display lid 318 and secondary display lid 322, respectively. When the end user grips either the left side of the primary display and the right side of the secondary display, or the right side of the primary display in the left side of the secondary display, the sensors on primary display lid 318 and secondary display lid 322 sense the touch. This causes the circuits to be closed, which allows an electrical signal to be provided to actuating trigger 350. When the electrical signal is provided to actuating trigger 350, then secondary display lid 322 can move freely up or down until the user removes at least one hand from one of the display lids. When the user removes at least one hand, the sensors illustrated in FIG. 22 open their circuits, and the electrical signal is removed from actuating trigger 350.

Other embodiments, besides the LGS 330 of FIGS. 3, 4, 5, and 6, are illustrated in this specification. One common feature of at least some embodiments used throughout this specification is the use of the ATP mechanism of FIGS. 21 and 22 to prevent a secondary display lid from moving in at least one direction. In other words, in the absence of the at least two selected inputs from the sensors of FIG. 22, an electrical stimulus is removed from the pivot means illustrated throughout this specification. A common feature of at least some embodiments of the pivot means disclosed herein is that, with the electrical stimulus removed, the pivot means bias the secondary display lid against movement in at least one direction. In an embodiment, the at least one direction is downward. Thus, absent the electrical stimulus, the pivot means prevent the secondary display lid from moving downward. Some of the embodiments illustrated herein permit the secondary display lid to move upward freely in the absence of electrical stimulus, while others bias against upward movement as well in the absence of the provided electrical stimulus.

FIGS. 7-9 disclose an embodiment including a lockable gas spring in attachment to a rack and pinion mechanism.

FIG. 7 illustrates a dual display laptop 700. Dual display laptop 700 includes a primary display 716 enclosed within a primary lid 718, a secondary display 720 within a secondary lid 722, a trackpad 712, and a keyboard 708, all within a clamshell form factor 704. In this illustration, laptop 700 includes one or more rack and pinion mechanisms 730 to cooperate with a lockable gas spring. In this illustration, a single rack and pinion mechanism 730 is visible in the perspective view. However, in other embodiments, more rack and pinion mechanisms 730 may be used, for example two rack and pinion mechanisms with one mechanism on either side of secondary lid 722.

A herringbone gear (i.e., a pinion) provides quiet and shock-free operation in conjunction with a lockable gas spring. Herringbone gears have better load carrying capacity compared to spur gears, and offer greater positional accuracy. Doubling up of the helical teeth removes the axial thrust of a single helical gear, and also helps keep the gear centered. Herringbone gears may be coupled to the secondary lid pivot shaft on either side of the secondary lid. A herringbone gear may also include a rack attached to the piston end of a lockable gas spring. Lockable gas springs may be mounted on the c-cover adjacent to keyboard 708.

Because both the rack and pinion are meshed during assembly, the angular position of the pinion may be controlled by linear movement of the rack. This linear movement may be dependent on the piston position of the lockable gas spring.

For example, in FIG. 8, an LGS 732 is illustrated with a rack 736 attached to the piston end. A pinion 738 engages secondary lid 722.

When LGS 732 has the rod completely retracted, rack 736 operates pinion 738 to move secondary lid 722 to a fully closed position.

However, as illustrated in FIG. 9, when LGS 732 extends its operating rod, rack 736 operates pinion 738 to raise secondary lid 722.

When the piston valve of LGS 732 is open, pinion 738 is free to rotate, while when the valve of LGS 732 is closed, the rotation of pinion 738 is locked. Thus, secondary lid 722 stays in place under the locked condition. In embodiments where an LGS 732 is provided on either side of the clamshell, both may be simultaneously controlled so that loads are distributed to both.

In the ATP mechanism illustrated in FIGS. 21 and 22, the activation trigger of each LGS 732 is pushed only when the user holds both the primary and secondary lids with one hand each. Once the activation trigger is activated, there is no or minimal resistance provided by LGS 732 for the movement of rack 736. The user can freely position the lid at any desired angle, for example between 0° and 90°, by rotating secondary lid 722 and then releasing either hand. Once at least one hand is released, and the ATP mechanism senses that the hand is released, the locking mechanism of LGS 732 is locked and the gas spring maintains that position. The user can then adjust the orientation of primary lid 718 to any desired position because primary lid 718 is attached using an ordinary friction hinge.

In an embodiment, when secondary lid 722 is at the 0° (e.g., fully retracted) position, the operating rod of LGS 732 is fully compressed. When secondary lid 722 is lifted with the piston valve being open, the piston rod is pulled out by rack 736. When the valve is closed, movement of rack 736 is locked, thus preventing rotation within secondary lid 722.

FIGS. 10-13 illustrate the use of a tapered, one-way roller clutch for raising and lowering a secondary lid.

Figure 10:
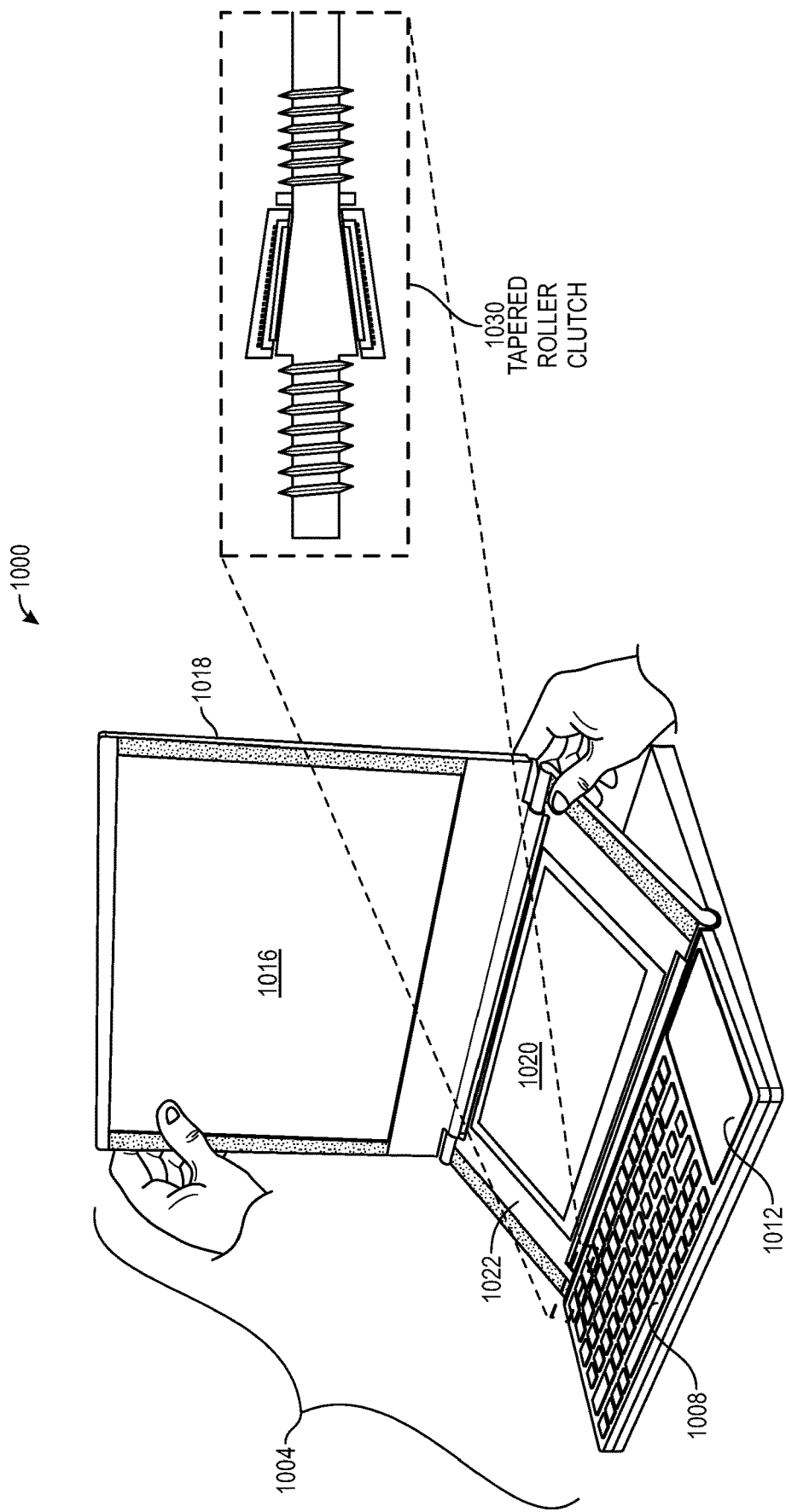
FIGS. 10-13 illustrate the use of a tapered, one-way roller clutch for raising and lowering a secondary lid.

FIG. 10 illustrates an embodiment of a dual display laptop 1000. Dual display laptop 1000 includes primary screen 1016 within primary lid 1018, secondary screen 1020 within secondary lid 1022, keyboard 1008, and trackpad 1012, all within a clamshell form factor 1004. Dual display laptop 1000 also includes a tapered roller clutch mechanism 1030.

Figure 11:
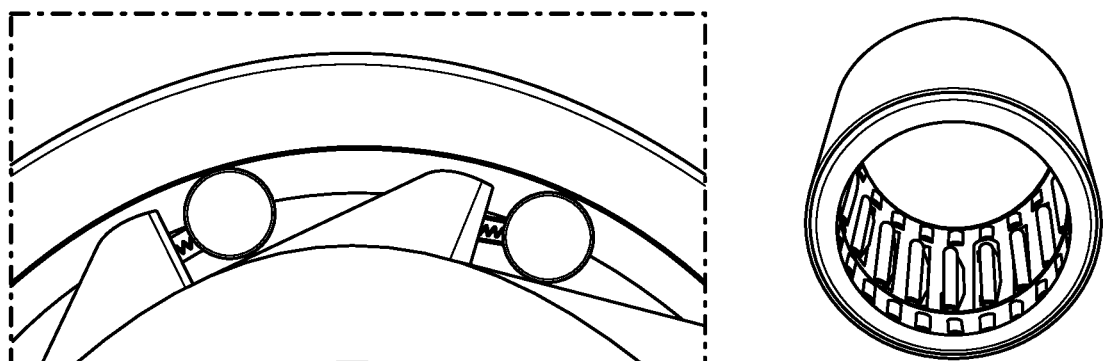

One-way roller clutches are similar to a needle bearing in construction. As illustrated in FIG. 11, a one-way roller clutch 1030 includes an outer race 1034, an inner race 1038, and rollers 1042 including roller pins or needles 1044.

Figure 12A:
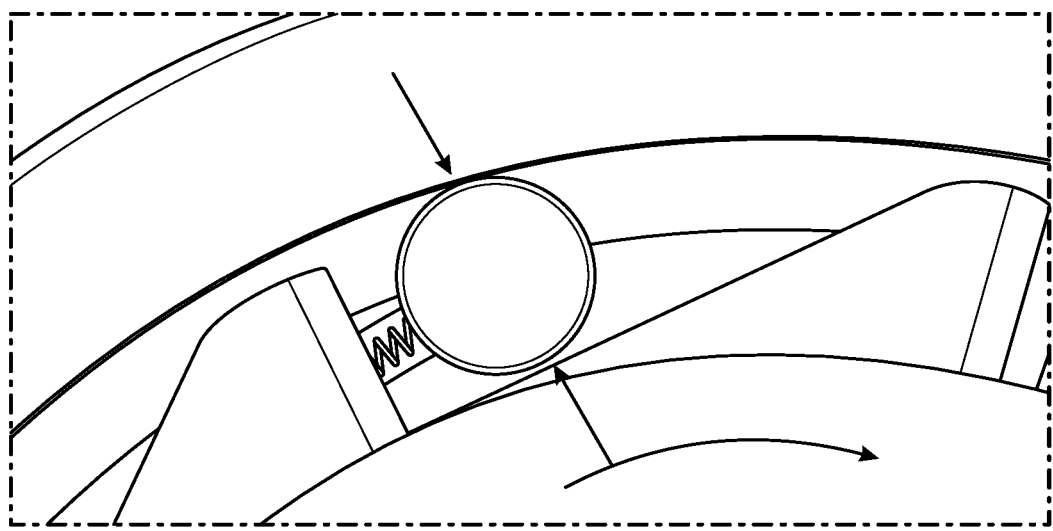

A drawn outer race 1034 engages cylindrical rollers 1042, which may be assembled inside a cage. Each roller 1042 is held in position inside the cage by a compression spring 1046 as seen in FIG. 12A. Generally, compression springs 1046 are in the shape of a mono leaf spring. One-way roller clutches may also be referred to as one-way bearings, anti-reverse bearings, or clutch bearings. FIG. 11 illustrates the general construction of a one-way roller clutch.

One-way roller clutches are compact and lightweight, and can operate directly on a shaft. Their general purpose is to transmit torque between the shaft and the housing in one direction and allow free motion in the opposite direction.

Figure 12B:
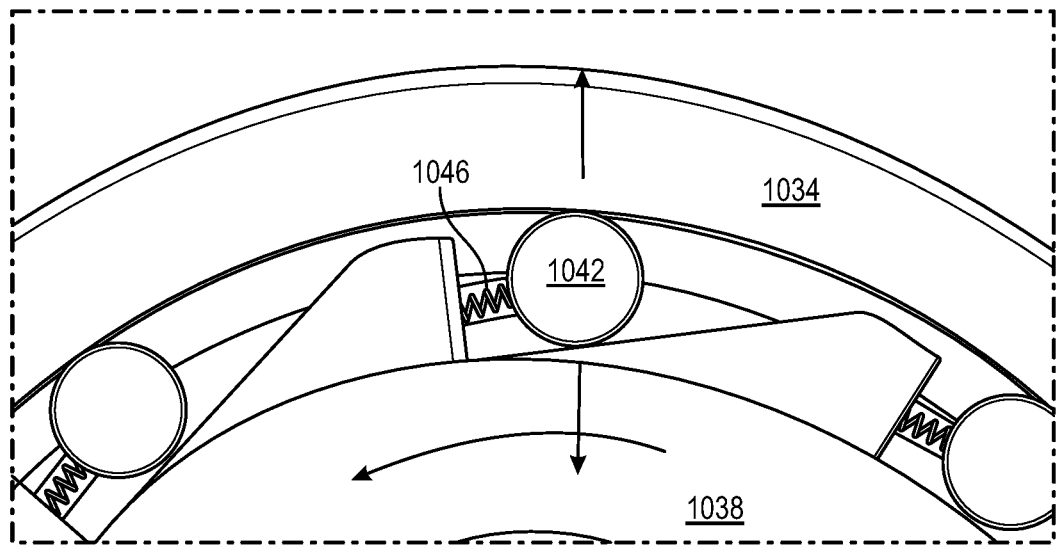

FIG. 12A illustrates clockwise rotation of the inner race. When inner race 1038 tries to rotate in a counterclockwise direction, rollers 1042 tend to move in the opposite direction, and compression springs 1046 push the rollers into the lesser space as illustrated in FIG. 12B. This prevents inner race 1038 from rotating. Rollers 1042 are in touch with both inner race 1034 and outer race 1038, and thus inner race 1038 becomes locked.

Assembly of roller clutches may be done by press fit. If the maximum torque carrying capacity of the roller clutch is well above the maximum torque required to hold the lids in position in the dual screen configuration, then the clutches may be used as a free-acting hinge mechanism. In some embodiments, a roller clutch could be used in connection with a Hirth ring.

However, tapered one-way roller clutches are not currently used in at least some applications because, previously, there was no known requirement of transmitting the torque in one direction allowing for free rotation in the opposite direction through a vertically mounted shaft. Thus, the present specification provides a tapered roller clutch bearing that combines the principles of tapered bearings and a roller clutch bearing.

Figure 13:
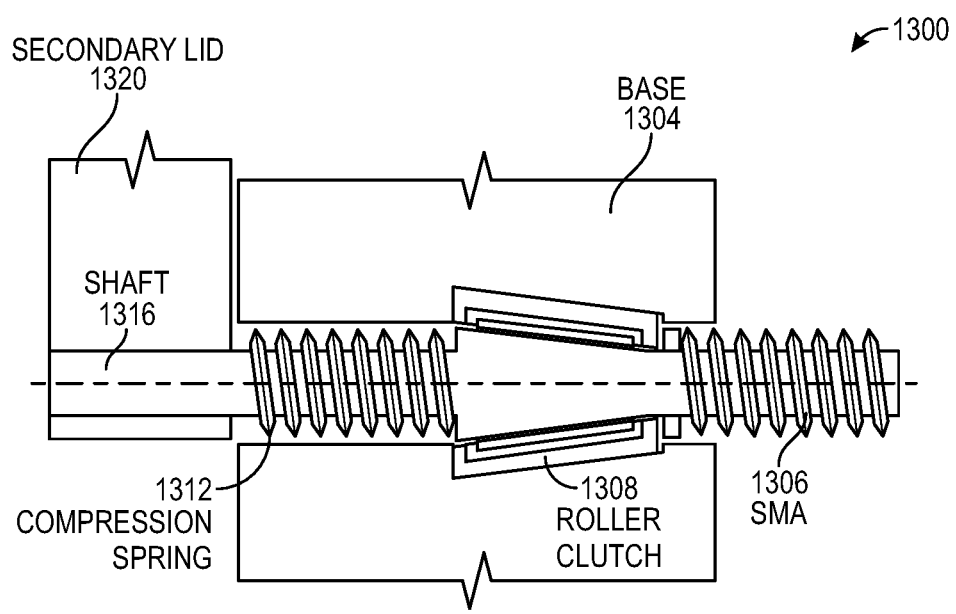

FIG. 13 illustrates elements of a tapered roller clutch 1300. Tapered roller clutches such as tapered roller clutch 1300 are very similar to regular roller clutches in operation. Tapered roller clutch 1300 transmits the torque in one direction and allows for free rotation in the opposite direction. Using tapered roller clutch 1300 in a horizontally mounted shaft helps in disengaging the torque without the need of a Hirth ring. The outer race of tapered roller clutch 1300 may be assembled in a converging or a diverging manner, and thus the section of the shaft inside the clutch also has a tapered or conical shape. In this embodiment, a compression spring 1312 is used to keep shaft 1316 engaged with the rollers of roller clutch 1308.

A shape memory alloy (SMA), in its deactivated condition, may offer lower force than compression spring 1312. SMA 1306 may be used on the opposite side of compression spring 1312, as illustrated. When SMA 1306 is activated by electrical current, it expands and offers more tensile force to overcome the force of compression spring 1312. This results in axial movement of shaft 1316, which disengages it from the rollers of roller clutch 1308. This allows for free rotation of shaft 1316 in the opposite direction, as well as in the forward direction.

In operation with a dual screen laptop, shaft 1316 may be directly connected to secondary lid 1322. Tapered roller clutch 1300 is press fitted to the c-cover. Compression spring 1312 may be used to always keep the tapered shaft inside the clutch. SMA 1306 may be used in opposition to compression spring 1312. As in previous embodiments, the SMA may be engaged by an ATP mechanism.

In this case, raising of the secondary screen can be done without any actuation by the user, because the tapered one-way roller clutch offers free rotation of the shaft in this direction. For lowering the secondary screen, the user may activate the trigger via the ATP mechanism, which energizes the SMA. The shaft is moved in the axial direction, out of the tapered roller clutch. This causes the shaft to disengage from the clutch, which allows for free rotation of the secondary lid in the lowering direction. Once the user positions the display at any desired angle and removes either hand from the sensor ATP mechanism, the SMA is de-energized. Now, the compression spring force acts on the shaft, which causes it to engage with the clutch. Thus, the lid stays at the desired location that the user sets it at.

FIGS. 14-17 illustrate yet another embodiment in which an SMA-based mono leaf spring is used inside a regular one-way roller clutch.

Figure 14:
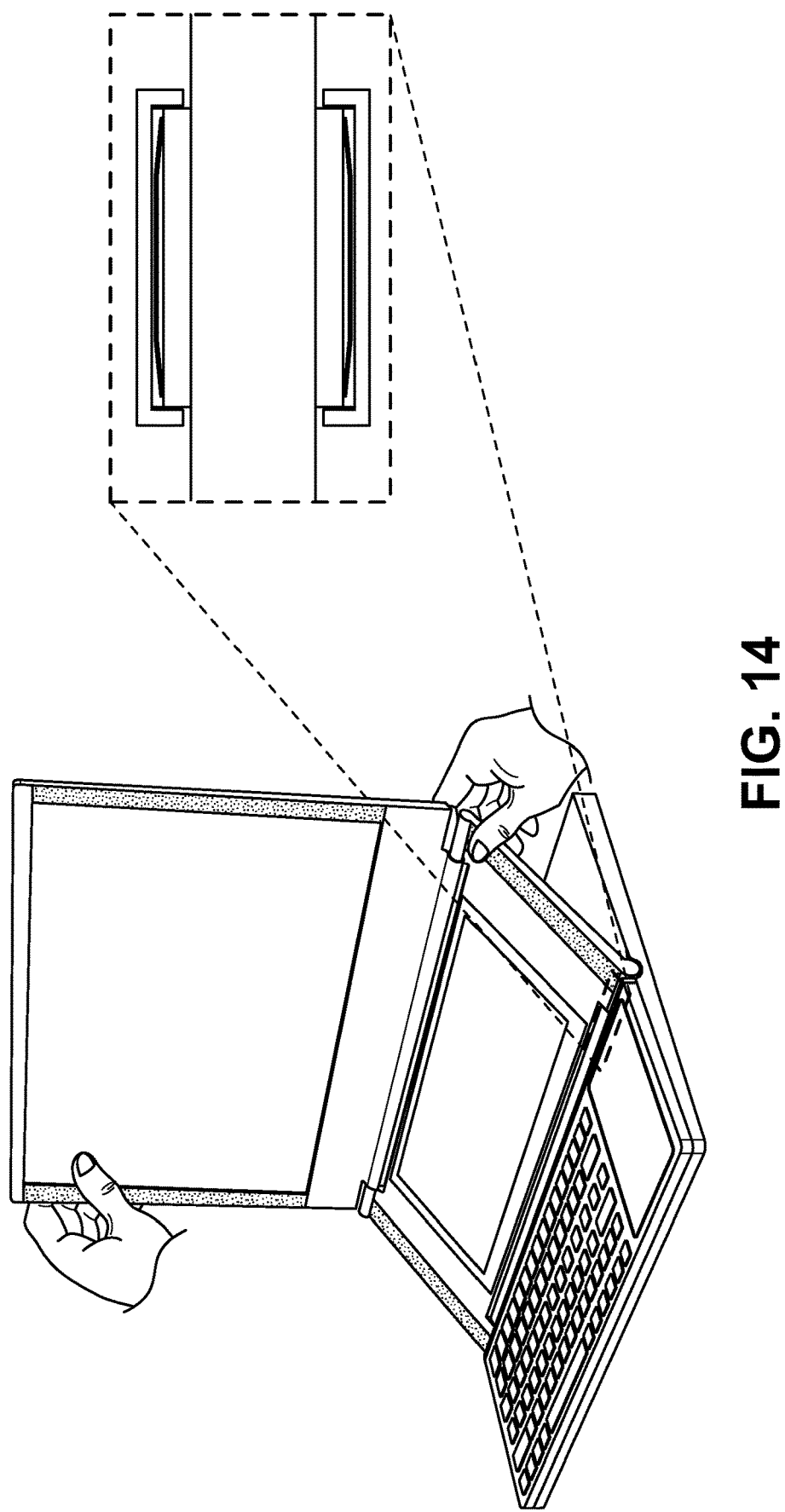
FIGS. 14-17 illustrate yet another embodiment in which a shape memory alloy (SMA)-based mono leaf spring is used inside a regular one-way roller clutch.

FIG. 14 illustrates a dual display laptop 1400. Dual display laptop 1400 includes a primary display 1416 within a primary lid 1418, a secondary display 1420 within a secondary lid 1420, a keyboard 1408, and a trackpad 1412, all within a clamshell form factor 1404. There is also illustrated the use of an SMA mono leaf spring mechanism 1430.

Figure 15:
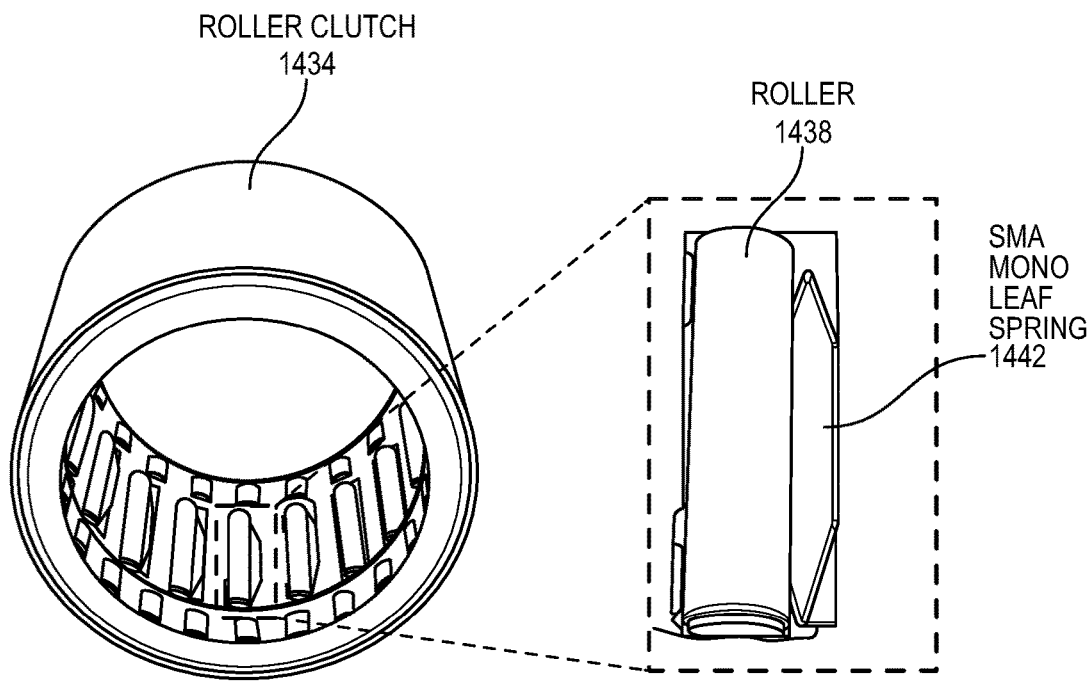

FIG. 15 illustrates an inside view of a one-way roller clutch 1434 within SMA-based mono leaf spring 1442. The construction of roller clutch 1434 may be similar or nearly identical to the construction of roller clutch 1030 of FIG. 10, with the exception that a tapered roller clutch is not required, and the regular mono leaf spring is replaced with an SMA mono leaf spring 1442.

As discussed in a previous embodiment, the torque transmission property of the one-way roller clutch is due to the action of a mono leaf spring acting on each of the rollers inside the clutch. The mono leaf springs may be manufactured using regular hardened spring steel material.

Because SMA material can be designed to act as a regular spring when it is not actuated, and to change its shape to the desired orientation when engaged, this property of the SMA can be utilized to allow for movement in any desired direction. When an SMA mono leaf spring 1442 is used with a roller clutch 1434 in connection with display laptop 1400, the shaft may be directly connected to the secondary lid 1422. The one-way roller clutch may be press fitted to the clamshell cover. The SMA-based mono leaf spring can be activated and deactivated via the ATP mechanism illustrated in FIGS. 21 and 22.

The user can raise secondary lid 1432 without expressly activating any trigger. This is because the one-way roller allows for free rotation of the shaft attached to secondary lid 1432. When the user wants to lower the secondary lid, the SMA-based mono leaf spring may need to be activated inside roller clutch 1434 through the ATP mechanism.

Figure 16:
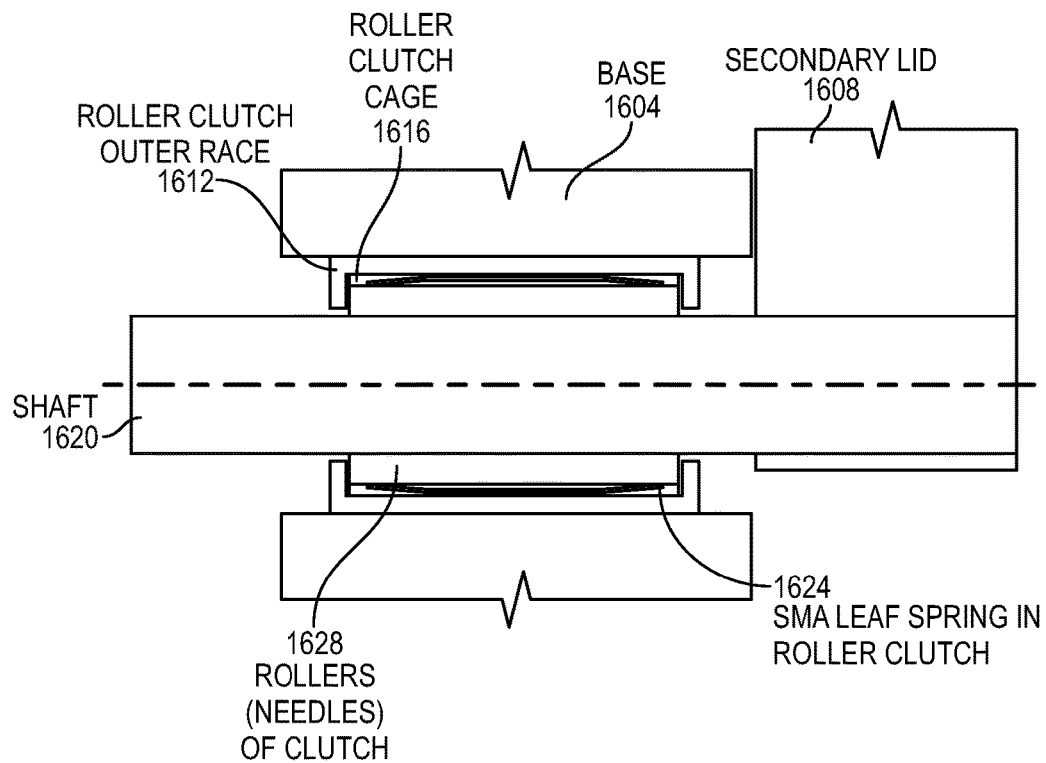

The mechanical configuration is illustrated in FIG. 16. There is a roller clutch outer race 1612 and a roller clutch cage 1616, engaging a shaft 1620 with rollers (or needles) of clutch 1628. Shaft 1620 engages secondary lid 1608. SMA leaf spring 1624 is provided within the roller clutch.

Once the ATP mechanism energizes leaf spring 1624 inside the roller clutch, current passes to the leaf spring 1624. When current passes to leaf spring 1624, its shape changes and it stops pushing rollers 1628 into the lesser space between the outer race and the inner race of the roller clutch. This allows for free rotation of shaft 1620, even in the direction of torque transmission of the clutch.

Figure 17:
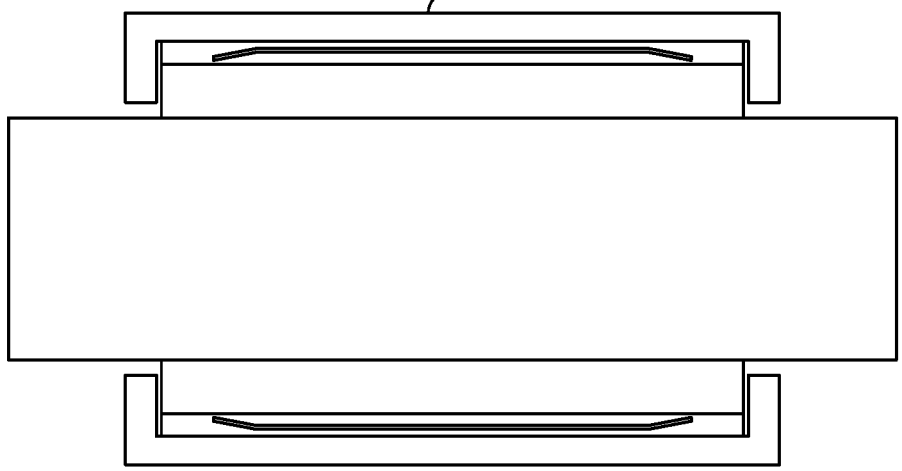
Figure 17:
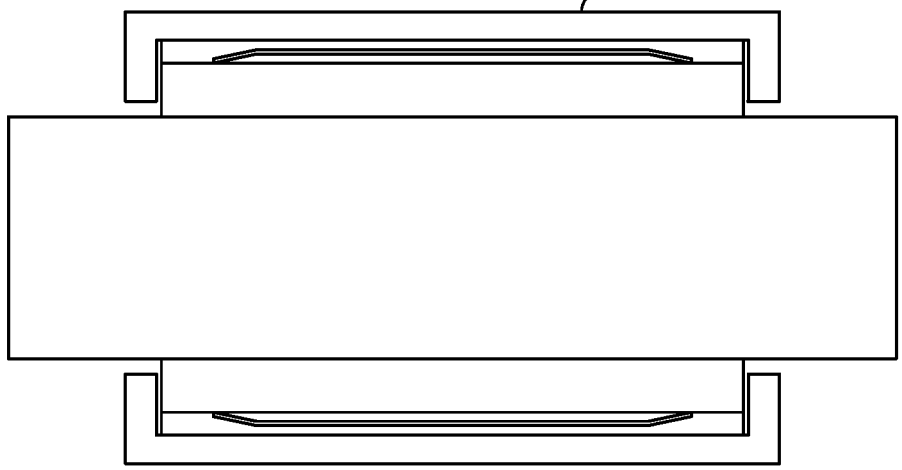

As illustrated in FIG. 17, the shape of SMA leaf spring 1704-1 (with no load acting on the roller) is different from the shape of SMA leaf spring 1704-2 (with a load acting on the roller).

When the SMA-based mono leaf spring is not actuated, the one-way roller clutch functions as a regular roller clutch. In other words, it transmits the torque in one direction and allows for free rotation of the shaft in the opposite direction. The SMA-based mono leaf spring may be designed such that when actuated, its shape changes (as illustrated in FIG. 17) to an almost straight beam. Thus, the mono leaf spring offers little or no force on the rollers. This causes the rollers to stay in the larger space available between the outer race and the inner race, allowing for free rotation of the shaft in either direction, including in the direction of torque transmission.

When the SMA-based mono leaf spring is deactivated, as in 1704-2, its shape changes back into the curved beam, thus offering more force on the rollers and pushing them toward the lesser space.

FIG. 18 illustrates the use of a roller clutch with an internal collet release 1830. FIG. 18 features a perspective view of a dual display laptop 1800. Dual display laptop 1800 includes primary display 1816 within primary lid 1818, secondary display 1820 within secondary lid 1822, keyboard 1808, and trackpad 1812, all within clamshell form factor 1804. Dual display laptop 1800 includes a roller clutch with an internal collet release 1830.

In at least some embodiments, the one-way roller clutch used should have a shaft inside the clutch that is substantially perfectly cylindrical. This transfers the torque through the shaft. If it were not substantially perfectly cylindrical, the shaft would slip inside the roller clutch in the direction of torque transmission. However, this phenomenon can actually be used to lower secondary lid 1822 without the use of Hirth rings. To achieve this with greater repeatability, an internal collet may be used at the end of the shaft where it engages with the rollers inside the clutch. Internal collets are work holding devices used in the manufacturing industry. The may also be referred to as expanding collets. They are used to grip the internal diameter of a workpiece and engage the outer diameter.

FIG. 19 illustrates an internal collet and drawbar. Internal collet 1830 includes a shaft 1834 with diametric slits 1836. Conical drawbar 1842 engages shaft 1834.

An internal collet typically includes a shaft with multiple diametrical slits 1838 at one end. The same end has a conical hole which can accommodate a conical drawbar 1842. Conical drawbar 1842 may be held in position with threads. When conical drawbar 1842 is fully placed in position, the outer surface of the slitted portion of shaft 1834 assumes the shape of a substantially perfect cylinder. When conical drawbar 1842 is pulled out, the slitted portion compresses and loses its cylindricity.

In dual display laptop 1800, roller clutch with internal collet release 1830 is directly connected to secondary lid 1822. The roller clutch may be press fitted into the clamshell base cover. The slitted portion of the collet may be assembled into the roller clutch along with the drawbar, which is directly attached to the secondary cover. The drawbar may be positioned inside the collet with the help of a compression spring. When an SMA wire is actuated, the SMA wire shrinks its length and pulls the drawbar out of the collet by overcoming the spring force. This allows the user to position secondary lid 1822 by activating the SMA wire, for example via an ATP mechanism as illustrated in FIGS. 21 and 22.

FIG. 20 illustrates additional details of operation of the internal collet. In this embodiment, the user can raise the secondary lid without activating any trigger, because the roller clutch always allows for free rotation of the collet in this direction.

In FIG. 20, secondary lid 2004 engages a shaft with internal collet structured end 2032. Base 2008 engages a roller clutch including a roller clutch cage 2012, mono leaf spring 2016, roller clutch outer race 2036, and roller clutch rollers 2040. A ball cage bearing 2028 reduces friction with shaft 2032. Compression spring 2020 biases shaft 2032 in one direction. SMA wire 2024 can pull shaft 2032 in an opposite direction, thus overcoming the strength of compression spring 2020 to withdraw conical drawbar 2042 from shaft 2032.

The user can raise the secondary lid 2004 without activating any trigger, because the roller clutch allows for free rotation of the collet in this direction. The solid end of shaft 2032 is attached to secondary lid 2004, while the slip end is inserted into the roller clutch. Drawbar 2042 is positioned inside shaft 2032 with the help of ball cage bearing 2028. Compression spring 2020 ensures that the drawbar is held in a completely inserted position, so that the collet is engaged with the rollers inside the clutch. This ensures that the position of the secondary lid is locked.

When the user wants to lower secondary lid 2004, the trigger is activated via the ATP mechanism illustrated in FIGS. 21 and 22. This energizes SMA wire 2024 with electric current. When SMA wire 2024 is energized, it shrinks its length and overcomes the force of compression spring 2020. SMA wire 2024 also pulls drawbar 2042 out of the collet, which makes the collet lose its cylindricity inside the roller clutch. Thus, the collet is free to rotate in the lowering direction as well.

The user may position the secondary lid at any desired angle, and then remove at least one hand from either the primary or secondary lid. Once at least one hand is removed, the ATP mechanism deactivates the trigger, which cuts the power supply to SMA wire 2024. Now, compression spring 2020 takes over and pushes drawbar 2042 into the collet, which causes the collet to regain its cylindricity. Thus, the collet is locked in the lowering position.

FIGS. 21-22 illustrate an ATP mechanism that may be used with any of the embodiments disclosed herein, or with any other compatible embodiment of an infinite holding pivot. The embodiments disclosed herein are actuated through automation. In other words, a trigger, sensor, SMA, motorized links and gears, electromagnetic actuations, or similar may be used.

Dual display laptop 2100 of FIG. 21 includes an ATP mechanism. ATP mechanisms may be used to prevent damage or injury when a machine is turned on accidentally, or if an operator is not focused during operation. An ATP mechanism may require two hands to activate, thus ensuring that the user's hands are not within the mechanism.

Dual display laptop 2100 includes primary display 2116 within primary lid 2118. Primary lid 2118 includes touch sensors 2117, such as along the bezels of display 2116. A secondary display 2120 is also provided within secondary lid 2122. Secondary lid 2122 includes secondary lid sensors 2121, which also may be provided along the bezels of secondary display 2120. Dual display laptop 2100 also includes a keyboard 2108 and trackpad 2112 within clamshell form factor 2104. In a dual display laptop such as dual laptop 2100 of FIG. 21, there is less potential for a user to become seriously injured than in heavy industrial machinery that uses similar ATP mechanisms. However, there is still some potential for user injury, as well as the potential for damage to the system, which could be expensive and/or nonrecoverable. Thus, an ATP mechanism may be used to detect the intent of the user and to activate or deactivate the pivot mechanism, according to the user's activation of the mechanism.

The ATP mechanism prevents inadvertent activation or deactivation of the pivot mechanism. This can be achieved by placing touch sensors on either side of both the primary and secondary lids, as illustrated in FIG. 21. Based on extensive user studies, it has been found that users commonly prefer to hold the primary and secondary lid in common locations. If a user holds the primary lid with his right hand, then he generally holds the secondary lid with his left hand (and vice versa), as illustrated in FIG. 21. Furthermore, users tend to hold the lids at or near the center of the bezel. Thus, these locations are suitable for placement of ATP sensors.

An ATP circuit may be designed such that the user must hold both the primary and secondary display to activate the trigger.

The placement of these displays is illustrated in FIG. 22. In FIG. 22, a primary left sensor 2208 is on the primary lid, and a secondary left sensor 2212 is on the secondary lid. A primary right sensor 2218 is on the primary lid, and a secondary right sensor 2220 is on the secondary lid. A hinge mechanism or pivot mechanism 2224 is provided, such as any of the pivot mechanisms described in this specification. Hinge mechanism 2224 is electrically activated in at least one direction. For example, some of the hinge mechanisms require electrical activation in either direction. Others allow it to be raised freely, but require electrical activation for the secondary lid to be lowered.

In the configuration illustrated in FIG. 22, power supply to trigger 2204 is interrupted if the correct combination of sensors is not triggered. A correct combination may include, for example, primary left sensor 2208 and secondary right sensor 2220, or primary right sensor 2216 and secondary left sensor 2212. If one of these combinations is triggered, then power is supplied to the trigger via power supply 2204. This engages the mechanism, permitting the secondary screen to be lowered and/or raised.

Thus, according to observed user behavior, a common touch base sensor can be used on either side of both the primary and secondary displays. When the user places a hand in any of the combinations mentioned above, in any of the common places, the circuit is completed and a signal is passed to the mechanism. When the user removes either hand, the circuit is broken, stopping the signal to the mechanism.

This ensures that any activation is done purely based on actual user intention to move the secondary pivot mechanism.

In some embodiments, activation of the pivot mechanism may be via a simple analog circuit. However, in other embodiments, it may be desirable to provide computer-implemented logic to read the state of the sensor, and to control activation of the pivot mechanism based on the logic. In some examples, this logic could be provided in firmware, or in other low-level logic provided on a motherboard, or could be provided in software provisioned within an operating system.

Figure 23:
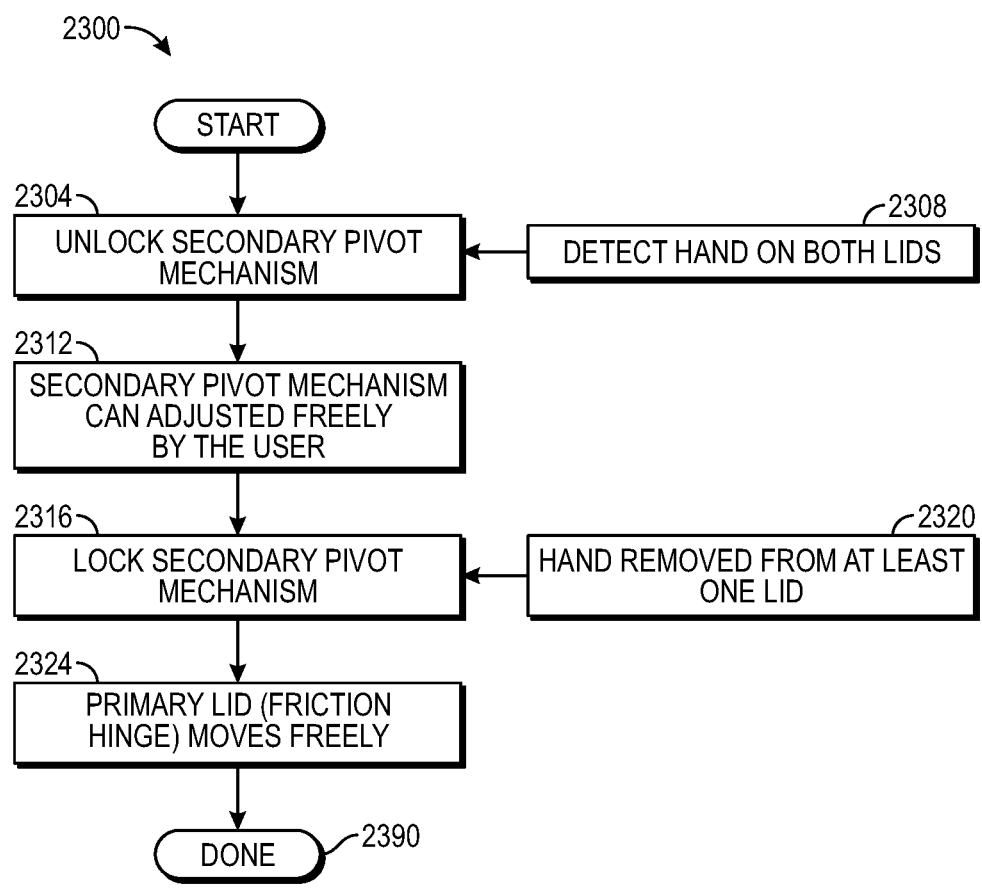
FIG. 23 is a flowchart of a method that may include digital logic to implement the locking mechanisms disclosed herein.

FIG. 23 is a flowchart of a method 2300 that may include digital logic to implement the locking mechanisms disclosed herein.

In block 2304, the logic detects an event 2308 that indicates a hand has been placed on both lids. The combinations of at least one embodiment are illustrated in FIG. 22. Namely, the combination is primary left and secondary right, or primary right and secondary left. If one of these combinations is detected, then in block 2304, the logic unlocks the secondary pivot mechanism.

In block 2312, while the secondary pivot mechanism is unlocked, the user may adjust the secondary pivot freely.

In block 2316, the logic detects an event 2320, indicating that a hand has been removed from at least one of the two lids. In block 2316, the logic then locks the secondary pivot mechanism. In this configuration, the secondary lid is locked in at least one direction (e.g., down). However, in block 2324, the primary lid (which moves on a standard friction hinge) can move freely.

In block 2390, the method is done.

Figure 24:
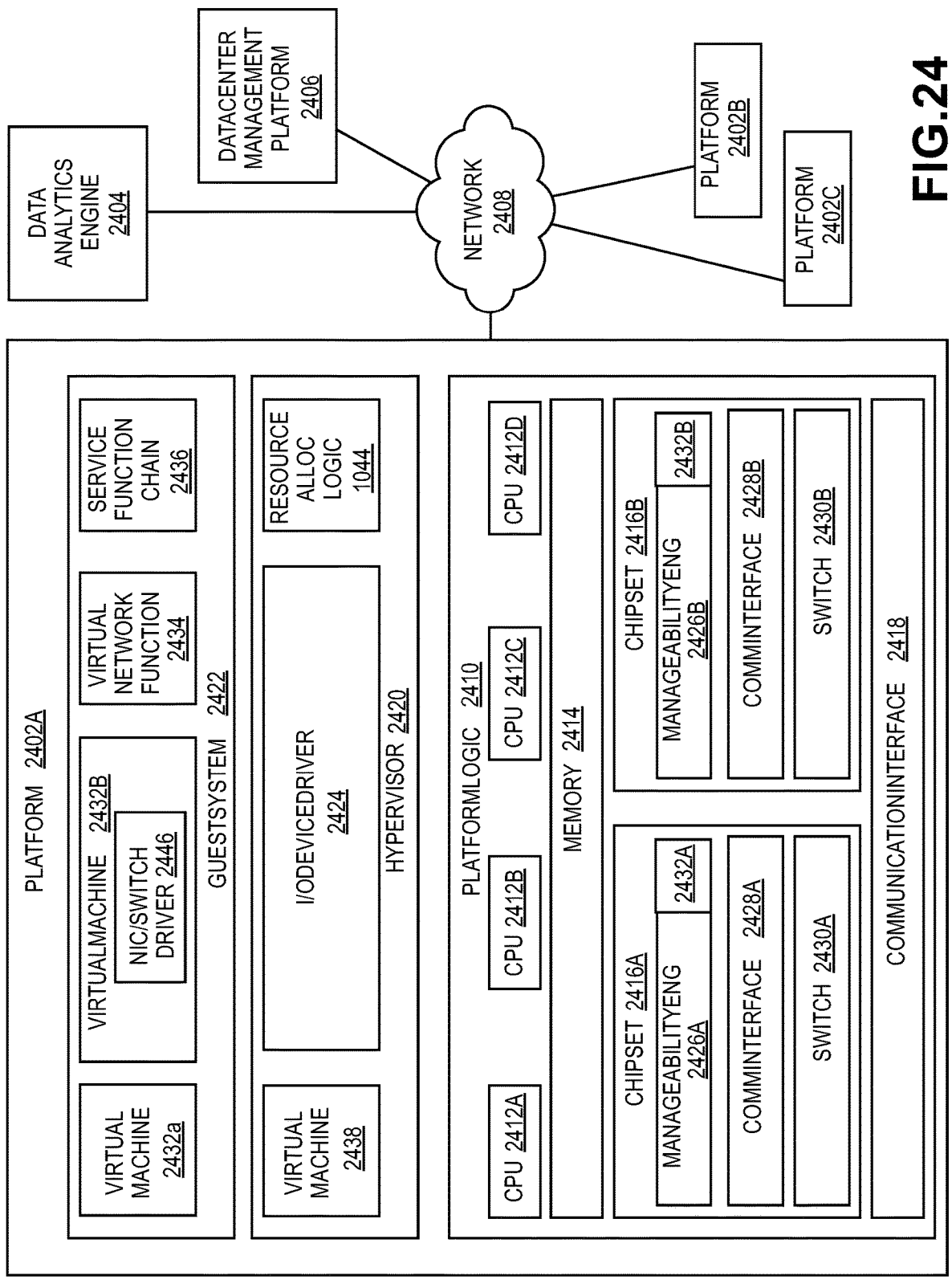
FIG. 24 is a block diagram of components of a computing platform.

FIG. 24 is a block diagram of components of a computing platform 2402A. Computing platform 2402A of FIG. 24 may be configured to provide infinite holding point pivots for dual screen systems, as disclosed in the present specification.

In the embodiment depicted, hardware platforms 2402A, 2402B, and 2402C, along with a data center management platform 2406 and data analytics engine 2404 are interconnected via network 2408. In other embodiments, a computer system may include any suitable number of (i.e., one or more) platforms, including hardware, software, firmware, and other components. In some embodiments (e.g., when a computer system only includes a single platform), all or a portion of the system management platform 2406 may be included on a platform 2402. A platform 2402 may include platform logic 2410 with one or more central processing units (CPUs) 2412, memories 2414 (which may include any number of different modules), chipsets 2416, communication interfaces 2418, and any other suitable hardware and/or software to execute a hypervisor 2420 or other operating system capable of executing workloads associated with applications running on platform 2402. In some embodiments, a platform 2402 may function as a host platform for one or more guest systems 2422 that invoke these applications. Platform 2402A may represent any suitable computing environment, such as a high-performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 2406, hypervisor 2420, or other operating system) of computer platform 2402A may assign hardware resources of platform logic 2410 to perform workloads in accordance with the stress information. In some embodiments, self-diagnostic capabilities may be combined with the stress monitoring to more accurately determine the health of the hardware resources. Each platform 2402 may include platform logic 2410. Platform logic 2410 comprises, among other logic enabling the functionality of platform 2402, one or more CPUs 2412, memory 2414, one or more chipsets 2416, and communication interfaces 2428. Although three platforms are illustrated, computer platform 2402A may be interconnected with any suitable number of platforms. In various embodiments, a platform 2402 may reside on a circuit board that is installed in a chassis, rack, or other suitable structure that comprises multiple platforms coupled together through network 2408 (which may comprise, e.g., a rack or backplane switch).

CPUs 2412 may each comprise any suitable number of processor cores and supporting logic (e.g., uncores). The cores may be coupled to each other, to memory 2414, to at least one chipset 2416, and/or to a communication interface 2418, through one or more controllers residing on CPU 2412 and/or chipset 2416. In particular embodiments, a CPU 2412 is embodied within a socket that is permanently or removably coupled to platform 2402A. Although four CPUs are shown, a platform 2402 may include any suitable number of CPUs.

Memory 2414 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 2414 may be used for short, medium, and/or long-term storage by platform 2402A. Memory 2414 may store any suitable data or information utilized by platform logic 2410, including software embedded in a computer-readable medium, and/or encoded logic incorporated in hardware or otherwise stored (e.g., firmware). Memory 2414 may store data that is used by cores of CPUs 2412. In some embodiments, memory 2414 may also comprise storage for instructions that may be executed by the cores of CPUs 2412 or other processing elements (e.g., logic resident on chipsets 2416) to provide functionality associated with the manageability engine 2426 or other components of platform logic 2410. A platform 2402 may also include one or more chipsets 2416 comprising any suitable logic to support the operation of the CPUs 2412. In various embodiments, chipset 2416 may reside on the same die or package as a CPU 2412 or on one or more different dies or packages. Each chipset may support any suitable number of CPUs 2412. A chipset 2416 may also include one or more controllers to couple other components of platform logic 2410 (e.g., communication interface 2418 or memory 2414) to one or more CPUs. In the embodiment depicted, each chipset 2416 also includes a manageability engine 2426.

Manageability engine 2426 may include any suitable logic to support the operation of chipset 2416. In a particular embodiment, a manageability engine 2426 (which may also be referred to as an innovation engine) is capable of collecting real-time telemetry data from the chipset 2416, the CPU(s) 2412 and/or memory 2414 managed by the chipset 2416, other components of platform logic 2410, and/or various connections between components of platform logic 2410. In various embodiments, the telemetry data collected includes the stress information described herein.

In various embodiments, a manageability engine 2426 operates as an out-of-band asynchronous compute agent which is capable of interfacing with the various elements of platform logic 2410 to collect telemetry data with no or minimal disruption to running processes on CPUs 2412. For example, manageability engine 2426 may comprise a dedicated processing element (e.g., a processor, controller, or other logic) on chipset 2416, which provides the functionality of manageability engine 2426 (e.g., by executing software instructions), thus conserving processing cycles of CPUs 2412 for operations associated with the workloads performed by the platform logic 2410. Moreover the dedicated logic for the manageability engine 2426 may operate asynchronously with respect to the CPUs 2412 and may gather at least some of the telemetry data without increasing the load on the CPUs.

A manageability engine 2426 may process telemetry data it collects (specific examples of the processing of stress information are provided herein). In various embodiments, manageability engine 2426 reports the data it collects and/or the results of its processing to other elements in the computer system, such as one or more hypervisors 2420 or other operating systems and/or system management software (which may run on any suitable logic such as system management platform 2406). In particular embodiments, a critical event such as a core that has accumulated an excessive amount of stress may be reported prior to the normal interval for reporting telemetry data (e.g., a notification may be sent immediately upon detection).

Additionally, manageability engine 2426 may include programmable code configurable to set which CPU(s) 2412 a particular chipset 2416 manages and/or which telemetry data may be collected.

Chipsets 2416 also each include a communication interface 2428. Communication interface 2428 may be used for the communication of signaling and/or data between chipset 2416 and one or more I/O devices, one or more networks 2408, and/or one or more devices coupled to network 2408 (e.g., system management platform 2406). For example, communication interface 2428 may be used to send and receive network traffic such as data packets. In a particular embodiment, a communication interface 2428 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 2416 (e.g., manageability engine 2426 or switch 2430) and another device coupled to network 2408. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 2428 may allow communication of data (e.g., between the manageability engine 2426 and the data center management platform 2406) associated with management and monitoring functions performed by manageability engine 2426. In various embodiments, manageability engine 2426 may utilize elements (e.g., one or more NICs) of communication interfaces 2428 to report the telemetry data (e.g., to system management platform 2406) in order to reserve usage of NICs of communication interface 2418 for operations associated with workloads performed by platform logic 2410.

Switches 2430 may couple to various ports (e.g., provided by NICs) of communication interface 2428 and may switch data between these ports and various components of chipset 2416 (e.g., one or more Peripheral Component Interconnect Express (PCIe) lanes coupled to CPUs 2412). Switches 2430 may be a physical or virtual (i.e., software) switch.

Platform logic 2410 may include an additional communication interface 2418. Similar to communication interfaces 2428, communication interfaces 2418 may be used for the communication of signaling and/or data between platform logic 2410 and one or more networks 2408 and one or more devices coupled to the network 2408. For example, communication interface 2418 may be used to send and receive network traffic such as data packets. In a particular embodiment, communication interfaces 2418 comprise one or more physical NICs. These NICs may enable communication between any suitable element of platform logic 2410 (e.g., CPUs 2412 or memory 2414) and another device coupled to network 2408 (e.g., elements of other platforms or remote computing devices coupled to network 2408 through one or more networks).

Platform logic 2410 may receive and perform any suitable types of workloads. A workload may include any request to utilize one or more resources of platform logic 2410, such as one or more cores or associated logic. For example, a workload may comprise a request to instantiate a software component, such as an I/O device driver 2424 or guest system 2422; a request to process a network packet received from a virtual machine 2432 or device external to platform 2402A (such as a network node coupled to network 2408); a request to execute a process or thread associated with a guest system 2422, an application running on platform 2402A, a hypervisor 2420 or other operating system running on platform 2402A; or other suitable processing request.

A virtual machine 2432 may emulate a computer system with its own dedicated hardware. A virtual machine 2432 may run a guest operating system on top of the hypervisor 2420. The components of platform logic 2410 (e.g., CPUs 2412, memory 2414, chipset 2416, and communication interface 2418) may be virtualized such that it appears to the guest operating system that the virtual machine 2432 has its own dedicated components.

A virtual machine 2432 may include a virtualized NIC (vNIC), which is used by the virtual machine as its network interface. A vNIC may be assigned a media access control (MAC) address or other identifier, thus allowing multiple virtual machines 2432 to be individually addressable in a network.

VNF 2434 may comprise a software implementation of a functional building block with defined interfaces and behavior that can be deployed in a virtualized infrastructure. In particular embodiments, a VNF 2434 may include one or more virtual machines 2432 that collectively provide specific functionalities (e.g., WAN optimization, virtual private network (VPN) termination, firewall operations, load balancing operations, security functions, etcetera). A VNF 2434 running on platform logic 2410 may provide the same functionality as traditional network components implemented through dedicated hardware. For example, a VNF 2434 may include components to perform any suitable network function virtualization (NFV) workloads, such as virtualized evolved packet core (vEPC) components, mobility management entities, 3rd Generation Partnership Project (3GPP) control and data plane components, etc.

SFC 2436 is a group of VNFs 2434 organized as a chain to perform a series of operations, such as network packet processing operations. Service function chaining may provide the ability to define an ordered list of network services (e.g. firewalls, load balancers) that are stitched together in the network to create a service chain.

A hypervisor 2420 (also known as a virtual machine monitor) may comprise logic to create and run guest systems 2422. The hypervisor 2420 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 2410. Services of hypervisor 2420 may be provided by virtualizing in software or through hardware assisted resources that require minimal software intervention, or both. Multiple instances of a variety of guest operating systems may be managed by the hypervisor 2420. Each platform 2402 may have a separate instantiation of a hypervisor 2420.

Hypervisor 2420 may be a native or bare metal hypervisor that runs directly on platform logic 2410 to control the platform logic and manage the guest operating systems. Alternatively, hypervisor 2420 may be a hosted hypervisor that runs on a host operating system and abstracts the guest operating systems from the host operating system. Hypervisor 2420 may include a virtual switch 2438 that may provide virtual switching and/or routing functions to virtual machines of guest systems 2422. The virtual switch 2438 may comprise a logical switching fabric that couples the vNICs of the virtual machines 2432 to each other, thus creating a virtual network through which virtual machines may communicate with each other.

Virtual switch 2438 may comprise a software element that is executed using components of platform logic 2410. In various embodiments, hypervisor 2420 may be in communication with any suitable entity (e.g., an SDN controller) which may cause hypervisor 2420 to reconfigure the parameters of virtual switch 2438 in response to changing conditions in platform 2402 (e.g., the addition or deletion of virtual machines 2432 or identification of optimizations that may be made to enhance performance of the platform).

Hypervisor 2420 may also include resource allocation logic 2444, which may include logic for determining allocation of platform resources based on the telemetry data (which may include stress information). Resource allocation logic 2444 may also include logic for communicating with various components of platform logic 2410 entities of platform 2402A to implement such optimization, such as components of platform logic 2410.

Any suitable logic may make one or more of these optimization decisions. For example, system management platform 2406; resource allocation logic 2444 of hypervisor 2420 or other operating system; or other logic of computer platform 2402A may be capable of making such decisions.

In various embodiments, the system management platform 2406 may receive telemetry data from and manage workload placement across multiple platforms 2402. The system management platform 2406 may communicate with hypervisors 2420 (e.g., in an out-of-band manner) or other operating systems of the various platforms 2402 to implement workload placements directed by the system management platform.

The elements of platform logic 2410 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 2402A may be coupled together in any suitable manner such as through one or more networks 2408. A network 2408 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid state drive, a flash memory, or other non-volatile medium. A computer-readable medium could also include a medium such as a ROM, a field-programmable gate array (FPGA), or application-specific integrated circuit (ASIC) configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, an encasement for a mobile computer, comprising: an external casing in a clamshell form factor, the external casing comprising a base, a secondary display chassis hingedly connected to the base at a secondary hinge, and a primary display chassis hingedly connected to the secondary display chassis at a primary hinge disposed at a removed edge of the secondary display chassis from the secondary hinge, the primary display chassis to substantially overlay the secondary display chassis and the base when the primary hinge is in a closed position; and pivot means disposed to substantially bias the secondary hinge against movement from a selected position in at least one direction in the absence of an electrical input.

There is further disclosed an example encasement, wherein the primary hinge is a friction hinge.

There is further disclosed an example encasement, wherein the at least one direction is downward, and wherein the pivot means are to permit free movement of the secondary hinge in an upward direction.

There is further disclosed an example encasement, wherein the pivot means are to bias the secondary hinge against movement in both an upward and a downward direction in the absence of the electrical input.

There is further disclosed an example encasement, further comprising an accidental trigger prevention (ATP) mechanism to remove the electrical input in the absence of sufficient minimal user hand-activated inputs.

There is further disclosed an example encasement, further comprising an accidental trigger prevention (ATP) mechanism comprising left and right primary switches disposed on left and right edges of the primary display chassis, and left and right secondary switches disposed on left and right edges of the secondary display chassis, and circuitry or logic to provide the electrical input only if the left primary switch and right secondary switch are closed, or if the left secondary switch and right primary switch are closed.

There is further disclosed an example encasement, wherein the pivot means comprise a lockable gas spring.

There is further disclosed an example encasement, further comprising a rack affixed to a piston of the lockable gas spring, and a pinion gear engaging the rack and disposed to translate horizontal motion of the rack to rotational motion of the secondary display chassis.

There is further disclosed an example encasement, wherein electrical input comprises electrical activation of an actuating trigger of the lockable gas spring.

There is further disclosed an example encasement, wherein the pivot means comprise a pair of lockable gas springs, disposed on left and right sides of the secondary display chassis, respectively.

There is further disclosed an example encasement, wherein the pivot means comprise a one-way roller clutch.

There is further disclosed an example encasement, wherein the one-way roller clutch is a tapered roller clutch.

There is further disclosed an example encasement, wherein the electrical input comprises an electrical activation of a shape metal alloy in opposition to a compression spring of the one-way roller clutch.

There is further disclosed an example encasement, wherein the one-way roller clutch comprises a shape metal alloy (SMA) leaf spring.

There is further disclosed an example encasement, wherein the electrical input comprises an electrical stimulus of the SMA leaf spring.

There is further disclosed an example encasement, further comprising an internal collet release within a shaft of the one-way roller clutch.

There is also disclosed an example laptop computer, comprising: a base of a clamshell casing, the base comprising a keyboard; a secondary display disposed within a secondary lid of the clamshell casing, the secondary lid hingedly connected to the base via a first hinge controlled by an electrically-actuated lockable gas spring (LGS), comprising a gas spring cylinder, a valve, a piston, and an actuating trigger, wherein the valve closes in the absence of an electrical input to the actuating trigger, and opens in the presence of an electrical input to the actuating trigger, and wherein the valve when closed prevents movement of the piston within the gas spring cylinder, and when open permits movement of the piston within the gas spring cylinder; and a primary display hingedly connected to the secondary display via a second hinge.

There is further disclosed an example laptop computer, wherein the second hinge comprises a friction hinge.

There is further disclosed an example laptop computer, further comprising an accidental trigger protection (ATP) circuit, the ATP circuit electrically configured to provide the electrical input when one or more sensors on the clamshell are triggered, and to not provide the electrical input when at least one sensor on the clamshell is not triggered.

There is further disclosed an example laptop computer, wherein the ATP circuit comprises left and right primary sensors disposed respectively on left and right sides of the primary lid, and left and right secondary sensors disposed respectively on left and right sides of the secondary lid, and wherein the ATP circuit is to provide the electrical input only if the left primary and right secondary, or right primary and left secondary, sensors are triggered.

There is further disclosed an example laptop computer, further comprising a rack affixed to a piston of the lockable gas spring, and a pinion gear engaging the rack and disposed to translate horizontal motion of the rack to rotational motion of the secondary display chassis.

There is further disclosed an example laptop computer, wherein the lockable gas spring is a first lockable gas spring, and further comprising a second lockable gas spring, wherein the first and second lockable gas springs are disposed on left and right sides respectively of the secondary lid.

There is also disclosed an example laptop computer, comprising: a foldable casing comprising a base, the base comprising a primary base structure comprising a keyboard and trackpad, and a secondary base structure comprising a secondary display, and a secondary display chassis, the secondary display chassis hingedly connected to the primary base structure at a controlled hinge point; and a primary display housed in a primary display chassis and hingedly connected to the secondary display chassis via a friction hinge; wherein the controlled hinge point comprises a one-way roller clutch that freely permits rotation up, and biases against rotation down in the absence of an electrical input.

There is further disclosed an example laptop computer, wherein the one-way roller clutch is a tapered roller clutch.

There is further disclosed an example laptop computer, wherein the electrical input comprises an electrical activation of a shape metal alloy in opposition to a compression spring of the one-way roller clutch.

There is further disclosed an example laptop computer, wherein the one-way roller clutch comprises a shape metal alloy (SMA) leaf spring.

There is further disclosed an example laptop computer, wherein the electrical input comprises an electrical stimulus of the SMA leaf spring.

There is further disclosed an example laptop computer, further comprising an internal collet release within a shaft of the one-way roller clutch.

What is claimed is:

1. An encasement for a mobile computer, comprising:
   an external casing in a clamshell form factor, the external casing comprising a base, a secondary display chassis hingedly connected to the base at a secondary hinge, and a primary display chassis hingedly connected to the secondary display chassis at a primary hinge;
   a current driver circuit to selectively apply an electrical current; and
   a one-way roller clutch disposed on the secondary hinge, the a one-way roller clutch comprising a shape memory alloy (SMA) spring in opposition to a compression spring of the one-way roller clutch, wherein the SMA spring is electrically connected to the current driver circuit and receives therefrom the electrical current, wherein the one-way roller clutch and SMA spring together freely permit upward rotation, bias against downward rotation when the electrical current is absent, and permit downward rotation when the electrical current is present.

2. The encasement of claim 1, further comprising:
an accidental trigger prevention (ATP) mechanism to remove the electrical current in absence of sufficient minimal user hand-activated inputs.

3. The encasement of claim 1, further comprising:
an accidental trigger prevention (ATP) mechanism including left and right primary switches disposed on left and right edges of the primary display chassis, and left and right secondary switches disposed on left and right edges of the secondary display chassis; and
circuitry or logic to provide the electrical current only if the left primary switch and right secondary switch are closed.

4. The encasement of claim 1, further comprising:
an accidental trigger prevention (ATP) mechanism including left and right primary switches disposed on left and right edges of the primary display chassis, and left and right secondary switches disposed on left and right edges of the secondary display chassis; and
circuitry or logic to provide the electrical current only if the left secondary switch and right primary switch are closed.

5. The encasement of claim 1, further comprising:
an accidental trigger prevention (ATP) mechanism including left and right primary switches disposed on left and right edges of the primary display chassis, and left and right secondary switches disposed on left and right edges of the secondary display chassis; and
circuitry or logic to provide the electrical current only if the left primary switch and right secondary switch are closed or if the left secondary switch and right primary switch are closed.

6. The encasement of claim 1, wherein the mobile computer is a laptop computer.

7. A mobile computer, comprising:
a foldable casing comprising a base, the base comprising a primary base structure comprising a keyboard and trackpad, and a secondary base structure comprising a secondary display and a secondary display chassis, the secondary display chassis hingedly connected to the primary base structure at a controlled hinge point;
a current driver circuit to selectively apply an electrical current; and
a primary display housed in a primary display chassis and hingedly connected to the secondary display chassis via a friction hinge, wherein the controlled hinge point comprises a one-way roller clutch comprising a shape memory alloy (SMA) spring in opposition to a compression spring of the one-way roller clutch, wherein the one-way roller clutch freely permits rotation up, and biases against rotation down except when the electrical current is applied.

8. The mobile computer of claim 7, wherein the one-way roller clutch is a tapered roller clutch.

9. The mobile computer of claim 7, further comprising an internal collet release within a shaft of the one-way roller clutch.

10. The mobile computer of claim 7, further comprising:
an accidental trigger prevention (ATP) mechanism to remove the electrical current in absence of sufficient minimal user hand-activated inputs.

11. The mobile computer of claim 7, further comprising:
an accidental trigger prevention (ATP) mechanism including left and right primary switches disposed on left and right edges of the primary display chassis, and left and right secondary switches disposed on left and right edges of the secondary display chassis; and
circuitry or logic to provide the electrical current only if the left primary switch and right secondary switch are closed.

12. The mobile computer of claim 7, further comprising:
an accidental trigger prevention (ATP) mechanism including left and right primary switches disposed on left and right edges of the primary display chassis, and left and right secondary switches disposed on left and right edges of the secondary display chassis; and
circuitry or logic to provide the electrical current only if the left secondary switch and right primary switch are closed.

13. The mobile computer of claim 7, further comprising:
an accidental trigger prevention (ATP) mechanism including left and right primary switches disposed on left and right edges of the primary display chassis, and left and right secondary switches disposed on left and right edges of the secondary display chassis; and
circuitry or logic to provide the electrical current only if the left primary switch and right secondary switch are closed or if the left secondary switch and right primary switch are closed.

14. A method comprising: display chassis is hingedly connected to the base at a hinge that includes a one-way roller clutch comprising a shape memory alloy (SMA) spring in opposition to a compression spring of the one-way roller clutch, wherein the one-way roller clutch and SMA spring together freely permit upward rotation of the display chassis relative to the base and are bias against downward rotation of the display chassis relative to the base when an electrical current is absent; and supplying the electrical current to permit downward rotation of the display chassis relative to the base.

15. The method of claim 14 comprising: a primary base structure that includes a keyboard and trackpad; a current driver circuit selectively applies the electrical current.

16. The method of claim 15 further comprising: removing the electrical current in absence of sufficient minimal user hand-activated inputs.

17. The method of claim 16 further comprising: an accidental trigger prevention (ATP) mechanism including left and right primary switches disposed on left and right edges of a primary display chassis, and left and right secondary switches is disposed on left and right edges of the display chassis and circuitry or logic provides the electrical current only if the left primary switch and right secondary switch are closed.

18. The method of claim 16 further comprising: an accidental trigger prevention (ATP) mechanism including left and right primary switches disposed on left and right edges of a primary display chassis, and left and right secondary switches is disposed on left and right edges of the secondary display chassis and circuitry or logic provides the electrical current only if the left secondary switch and right primary switch are closed.

19. The method of claim 18 further comprising: an accidental trigger prevention (ATP) mechanism including left and right primary switches disposed on left and right edges of a primary display chassis, and left and right secondary switches is disposed on left and right edges of the secondary display chassis and circuitry or logic provides the electrical current only if the left primary switch and right secondary switch are closed or if the left secondary switch and right primary switch are closed.

* * * * *

UNITED STATES PATENT AND TRADEMARK OFFICE
CERTIFICATE OF CORRECTION

| | |
|---|---|
| PATENT NO. | : 11,573,611 B2 |
| APPLICATION NO. | : 17/365122 |
| DATED | : February 7, 2023 |
| INVENTOR(S) | : Yogesh Channaiah et al. |

It is certified that error appears in the above-identified patent and that said Letters Patent is hereby corrected as shown below:

In the Claims

In Column 22, Claim 1, Line 58, delete "the a" and insert -- the --, therefor.

Signed and Sealed this
Fourteenth Day of March, 2023

Katherine Kelly Vidal
*Director of the United States Patent and Trademark Office*